(12) United States Patent
Endo

(10) Patent No.: US 10,230,235 B2
(45) Date of Patent: Mar. 12, 2019

(54) SEMICONDUCTOR DEVICE AND POWER FEED SYSTEM

(71) Applicant: RENESAS ELECTRONICS CORPORATION, Tokyo (JP)

(72) Inventor: Takefumi Endo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 213 days.

(21) Appl. No.: 15/417,991

(22) Filed: Jan. 27, 2017

(65) Prior Publication Data

US 2017/0222435 A1 Aug. 3, 2017

(30) Foreign Application Priority Data

Jan. 28, 2016 (JP) .................................. 2016-014660
Jan. 28, 2016 (JP) .................................. 2016-014671
Sep. 28, 2016 (JP) .................................. 2016-189574

(51) Int. Cl.
*H02H 3/20* (2006.01)
*H02H 5/04* (2006.01)
*H02J 1/00* (2006.01)

(52) U.S. Cl.
CPC .............. *H02J 1/00* (2013.01); *H02H 3/202* (2013.01); *H02H 5/047* (2013.01)

(58) Field of Classification Search
CPC .... H02J 1/00; H02H 3/00; H02H 3/20; H02H 3/202; H02H 5/00; H02H 5/04; H02H 5/047
USPC .......................................................... 307/24
See application file for complete search history.

(56) References Cited

U.S. PATENT DOCUMENTS

2012/0151231 A1    6/2012    Hatta

FOREIGN PATENT DOCUMENTS

JP         2012-123673 A        6/2012

*Primary Examiner* — Hal Kaplan
(74) *Attorney, Agent, or Firm* — McDermott Will & Emery LLP

(57) ABSTRACT

A semiconductor device includes a power supply circuit which generates an output voltage to be supplied to a USB device connected to a USB connector, a sensing circuit which senses an output voltage or an output state of the power supply circuit, a control circuit which controls the power supply circuit, and a register which stores an output set voltage value associated with the power supply circuit or various types of information. The control circuit outputs a notification signal based on a result of sensing by the sensing circuit to the outside.

22 Claims, 34 Drawing Sheets

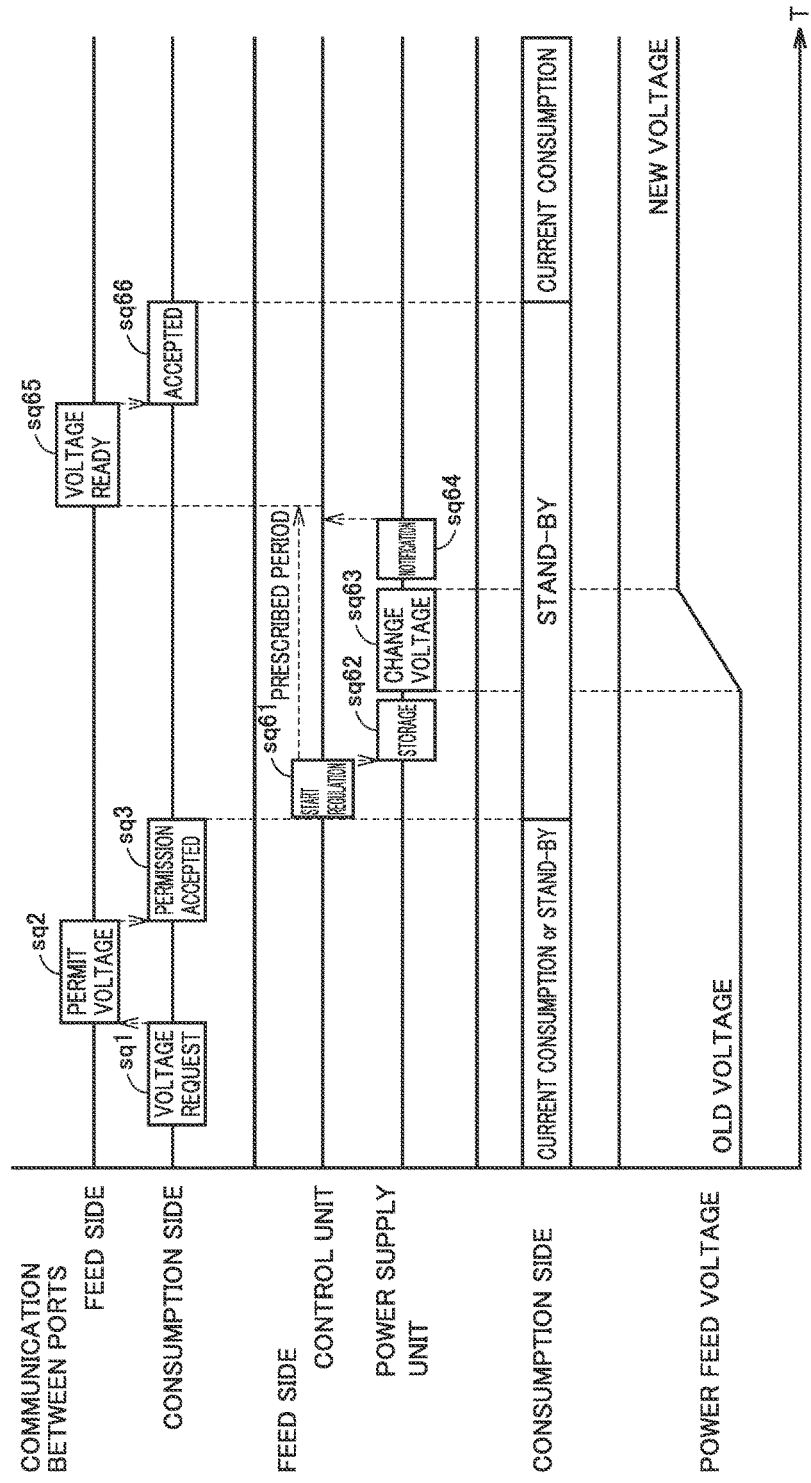

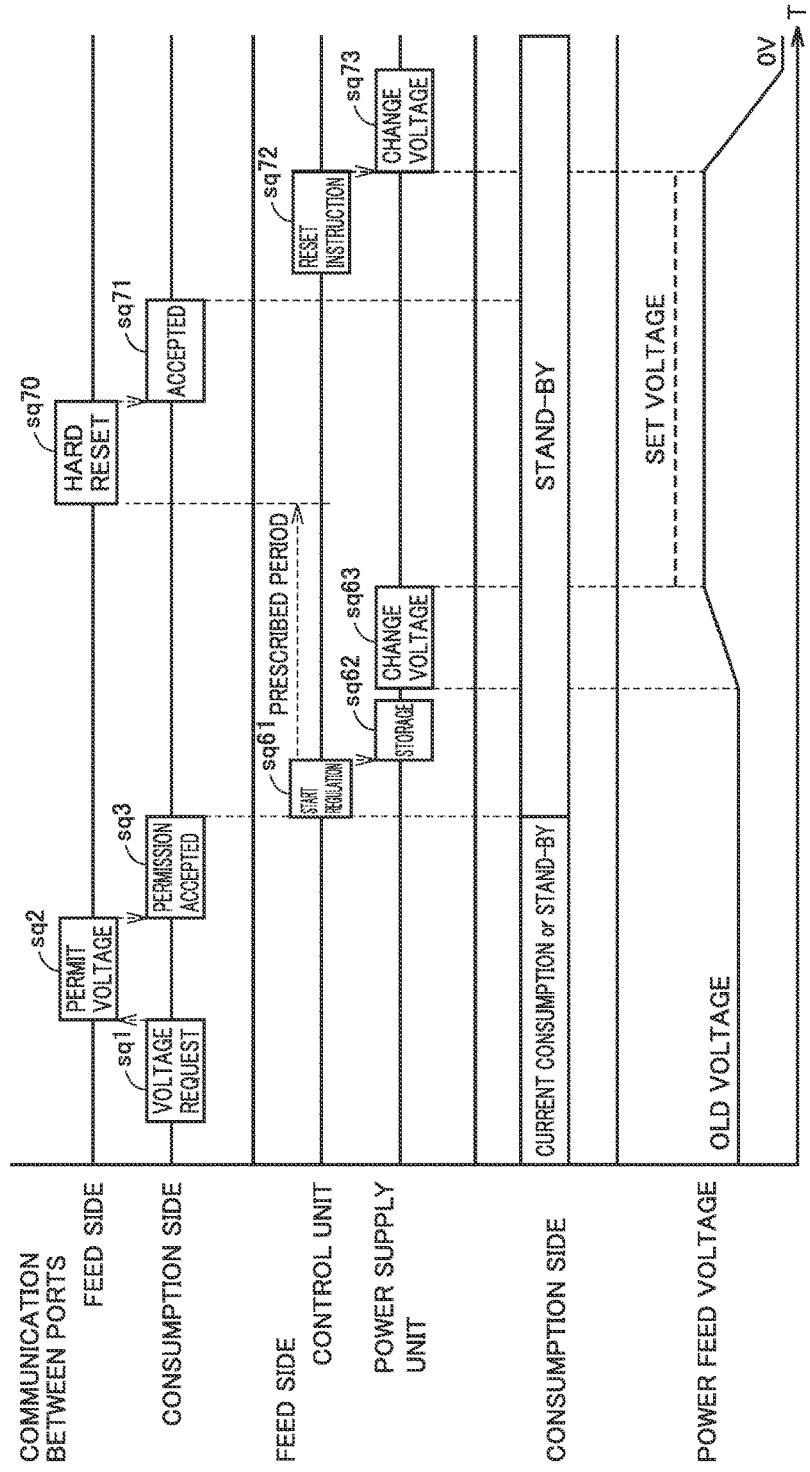

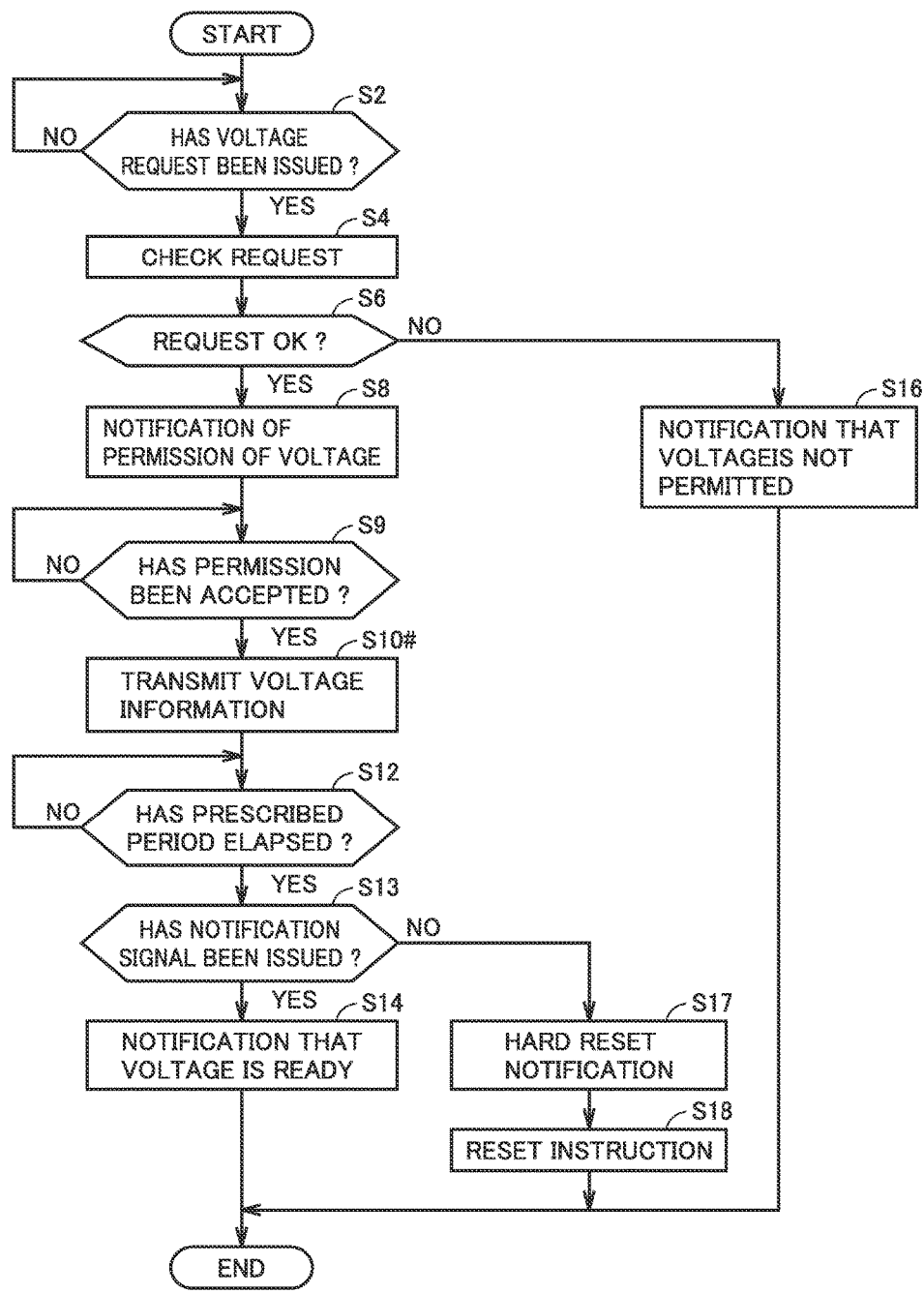

SEMICONDUCTOR DEVICE AND POWER FEED SYSTEM

This nonprovisional application is based on Japanese Patent Applications Nos. 2016-014671, 2016-014660, and 2016-189574 filed with the Japan Patent Office on Jan. 28, 2016, Jan. 28, 2016 and Sep. 28, 2016, respectively, the entire contents of which are hereby incorporated by reference.

BACKGROUND OF THE INVENTION

Field of the Invention

The present disclosure relates to a power supply circuit which generates an output voltage to be supplied to a universal serial bus (USB) device.

Description of the Background Art

A configuration in which electric power is supplied to a USB device through a USB connector (also referred to as USB power feed) has conventionally been known (Japanese Patent Laying-Open No. 2012-123673).

SUMMARY OF THE INVENTION

An output voltage supplied to a conventional USB device has been fixed (by way of example, 5 V).

Equipment having a USB connector has recently increased and each piece of equipment is expected to be fed power through a USB.

In this connection, since requested electric power is different for each piece of equipment, an output voltage on a power feed side is not fixed but should be variable, and various protection functions are provided to ensure safety of power feed at a high voltage.

In case of a failure, there has been no means for holding a state of the failure and it has not been possible to perform an operation appropriate in accordance with a state.

The present disclosure was made to solve the problems above, and an object is to provide a semiconductor device and a power feed system which can perform an operation appropriate in accordance with a state of a power supply circuit.

Other objects and novel features will become apparent from the description herein and the accompanying drawings.

According to one example, a semiconductor device includes a power supply circuit which generates an output voltage to be supplied to a USB device connected to a USB connector, a sensing circuit which senses the output voltage or an output state of the power supply circuit, a control circuit which controls the power supply circuit, and a register which stores an output set voltage value associated with the power supply circuit or various types of information. The control circuit outputs a notification signal based on a result of sensing by the sensing circuit to the outside.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a sequence diagram when a voltage level is regulated from an old voltage to a new voltage in a power supply control system 1# based on the second embodiment.

FIG. 24 is a sequence diagram illustrating an operation in an abnormal condition in regulation of a voltage level in power supply control system 1# based on the second embodiment.

FIG. 25 is a flowchart when processing for regulating a voltage level in a power delivery control unit 16# based on the second embodiment is performed.

DESCRIPTION OF THE PREFERRED EMBODIMENTS

Figure 1:
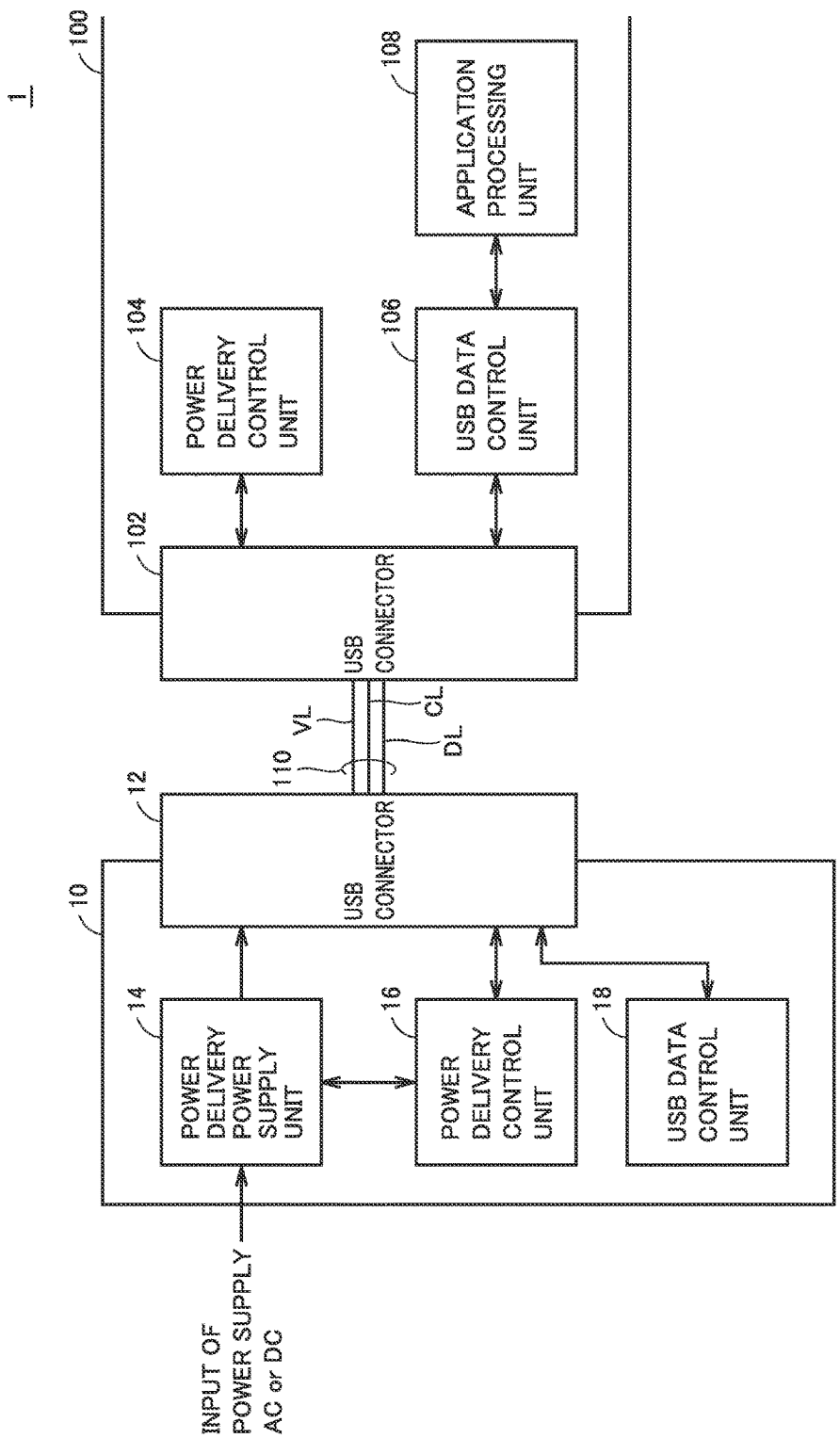
FIG. 1 is a diagram illustrating a configuration of a power supply control system 1 based on a first embodiment.

An embodiment will be described in detail with reference to the drawings. The same or corresponding elements in the drawings have the same reference characters allotted and description thereof will not be repeated.

First Embodiment

<A. Overall Configuration>
<a1. Configuration of Power Supply Control System 1>
FIG. 1 is a diagram illustrating a configuration of a power supply control system 1 based on a first embodiment.

Referring to FIG. 1, power supply control system 1 includes a power feed device (power feed control device) 10 and a power reception device 100.

Power reception device 100 has a USB connector 102, a power delivery control unit 104, a USB data control unit 106, and an application processing unit 108.

Power feed device 10 has a USB connector 12, a power delivery power supply v 14, a power delivery control unit 16, and a USB data control unit 18.

USB connector 12 and USB connector 102 are connected to each other through a USB bus 110.

USB bus 110 includes a power supply line VL, a data line DL, and a control data line CL.

Power reception device 100 receives supply of a voltage from power feed device 10 through power supply line VL when USB connector 102 and USB connector 12 are connected to each other through USB bus 110.

Power reception device 100 and power feed device 10 are configured to be able to supply and receive data to and from each other through data line DL when USB connector 102 and USB connector 12 are connected to each other through USB bus 110. Data is supplied and received through data line DL between USB data control unit 18 of power feed device 10 and USB data control unit 106 of power reception device 100.

Power reception device 100 and power feed device 10 are configured to be able to supply and receive control data to and from each other through control data line CL when USB connector 102 and USB connector 12 are connected to each other through USB bus 110. Control data is supplied and received through control data line CL between power delivery control unit 16 of power feed device 10 and power delivery control unit 104 of power reception device 100.

Power delivery control unit 16 controls power delivery power supply unit 14. Specifically, power delivery control unit 16 indicates setting of a level of a voltage to be supplied to power delivery power supply unit 14. In the present example, power delivery power supply unit 14 is a power supply device which can variably regulate a level of a voltage to be supplied to the outside upon receiving input of an alternating current (AC) voltage or a direct current (DC) voltage as a power supply input. By way of example, a voltage level can be regulated in a range from 5 V to 20 V. Power delivery control unit 16 communicates with power reception device 100 through control data line CL and controls power delivery power supply unit 14 based on voltage data from power reception device 100.

Power delivery control unit 104 has electric power necessary for each unit supplied, upon receiving supply of a voltage from power feed device 10 through power supply line VL. Power delivery control unit 104 communicates with power delivery control unit 16 through control data line CL. Specifically, power delivery control unit 104 transmits voltage data on a voltage necessary for power reception device 100 to power delivery control unit 16 through control data line CL.

USB data control unit 106 supplies and receives data to and from USB data control unit 18 of power feed device 10 connected through USB bus 110.

Application processing unit 108 is a unit executing a prescribed application. As a central processing unit (CPU) executes a program, a prescribed application is executed. USB data control unit 106 transfers data from equipment connected through USB connector 102 to application processing unit 108 as necessary and transmits data from application processing unit 108 to equipment connected through USB connector 102.

<a2. Configuration of Power Feed Device 10>
FIG. 2 is a diagram illustrating a configuration of power feed device 10 based on the first embodiment.

Figure 2:
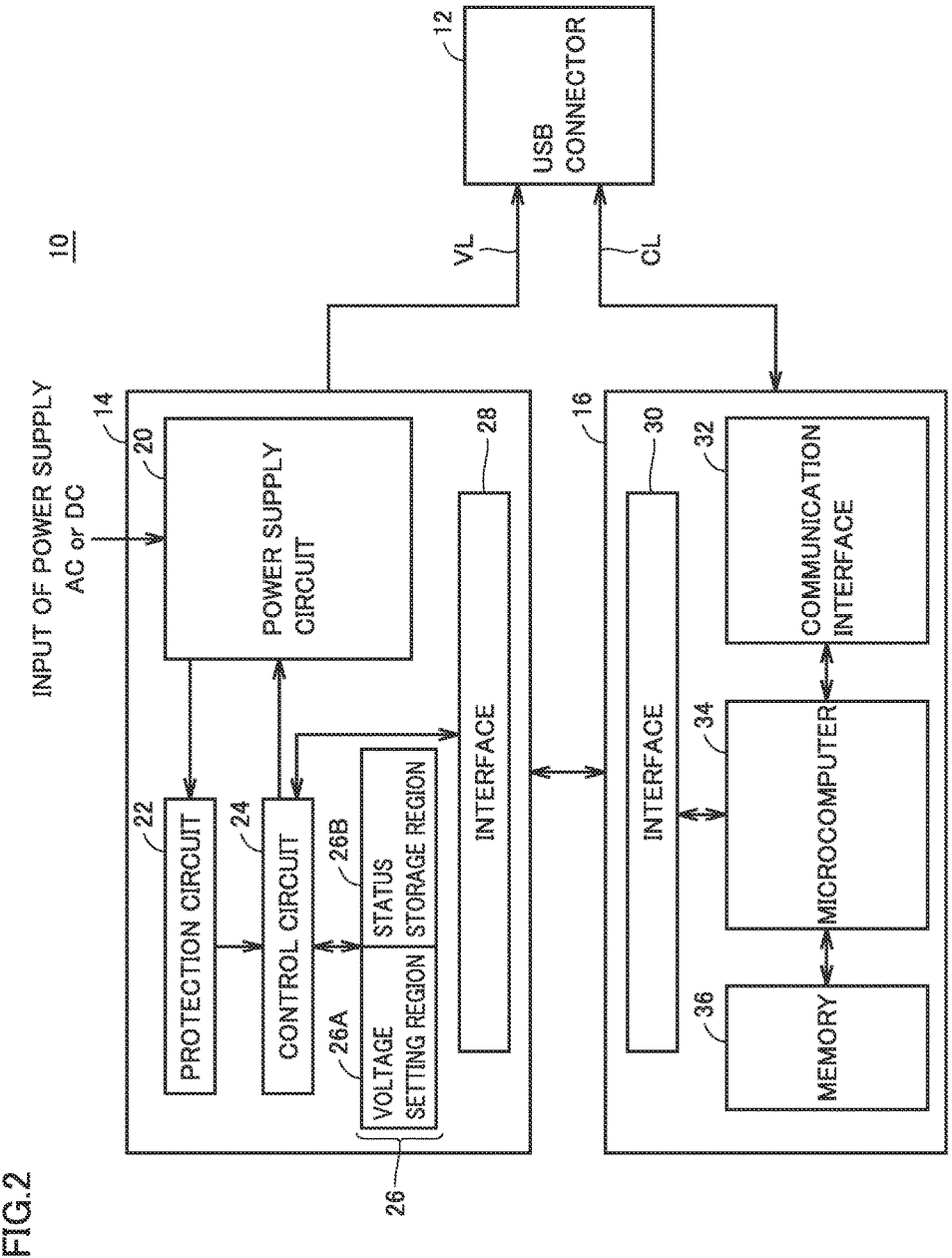
FIG. 2 is a diagram illustrating a configuration of a power feed device 10 based on the first embodiment.

Referring to FIG. 2, power feed device 10 includes USB connector 12, power delivery power supply unit 14, and power delivery control unit 16. USB data control unit 18 is not shown.

Power delivery power supply unit 14 includes a power supply circuit 20, a protection circuit 22, a control circuit 24, a register 26, and an interface 28.

Power supply circuit 20 generates a power supply voltage to be supplied to the outside, upon receiving input of an alternating current (AC) voltage or a direct current (DC) voltage as a power supply input. Power supply circuit 20 supplies a generated power supply voltage to another USB device through USB connector 12 connected to power supply line VL.

Protection circuit 22 is a circuit for ensuring safety of power delivery power supply unit 14. For example, when a junction temperature of power supply circuit 20 increases, the circuit is activated and notifies control circuit 24 of an abnormal condition. Control circuit 24 instructs power supply circuit 20 to stop power supply based on the notification.

Control circuit 24 controls entire power delivery power supply unit 14.

Interface 28 is connected to control circuit 24. Interface 28 transmits data from control circuit 24 to power delivery control unit 16, or receives data from power delivery control unit 16 and transfers the data to control circuit 24.

Register 26 stores information on power delivery power supply unit 14.

Specifically, register 26 includes a voltage setting region 26A where information on setting of a power supply voltage of power supply circuit 20 is stored and a status storage region 26B where information on an internal state of power supply circuit 20 is stored.

Control circuit 24 writes data into register 26 as necessary and reads data stored in register 26 and transmits the data to power delivery control unit 16 through interface 28.

Power delivery control unit 16 includes an interface 30, a communication interface 32, a microcomputer 34, and a memory 36.

Microcomputer 34 controls entire power delivery control unit 16.

Memory 36 stores various programs. Microcomputer 34 performs a prescribed function based on a program stored in memory 36.

Interface 30 is used for supplying and receiving data to and from power delivery power supply unit 14.

Interface 30 is connected to microcomputer 34. Interface 30 transmits data from microcomputer 34 to power delivery power supply unit 14 or receives data from power delivery power supply unit 14 and transfers the data to microcomputer 34.

Communication interface 32 is an interface for establishing power delivery control communication with another USB device through USB connector 12 connected to control data line CL.

Communication interface 32 is connected to microcomputer 34. Communication interface 32 transmits control data from microcomputer 34 to another USB device (power reception device 100) or receives control data from another USB device (power reception device 100) and transfers the control data to microcomputer 34.

<a3. Configuration of Protection Circuit 22>

Figure 3:
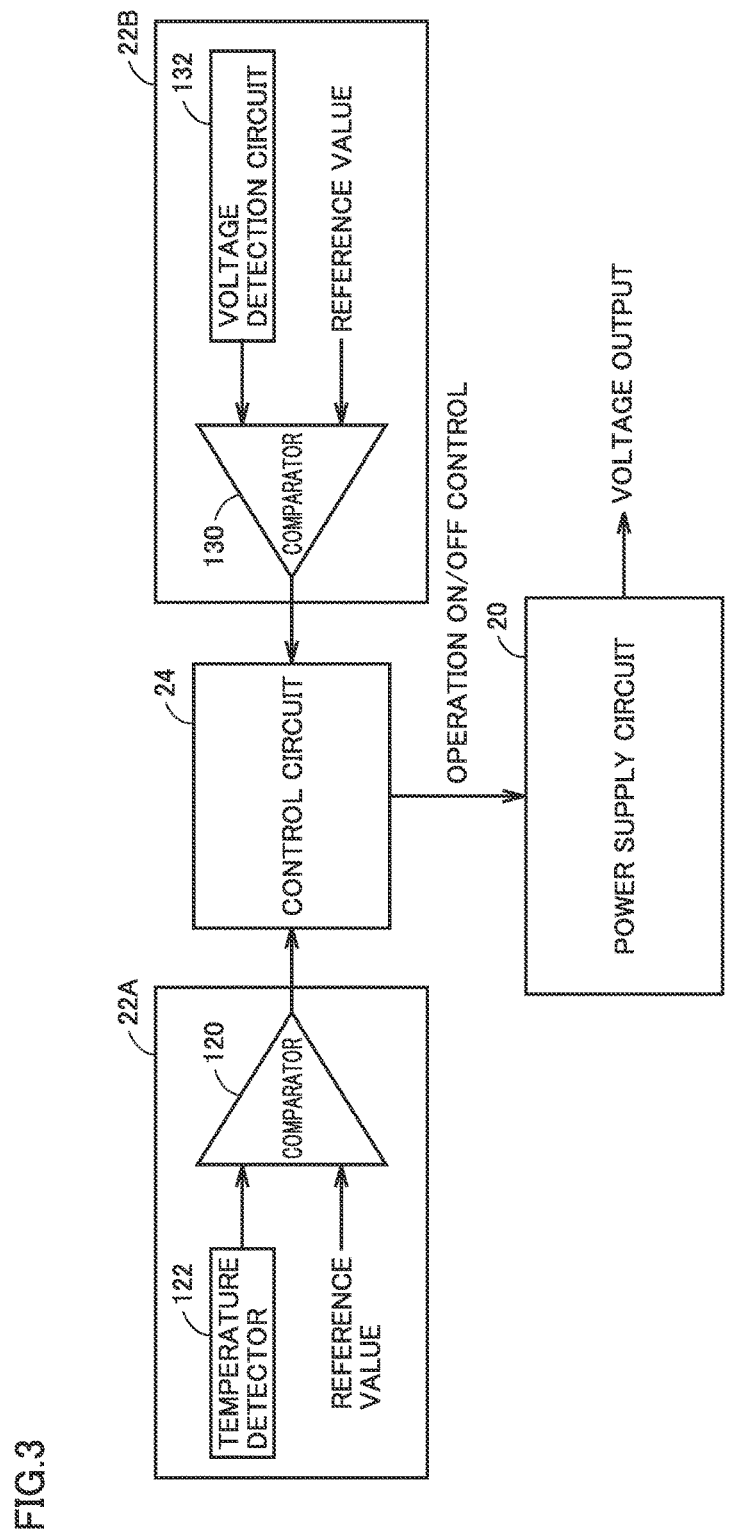
FIG. 3 is a diagram illustrating a configuration of a protection circuit 22 based on the first embodiment.

FIG. 3 is a diagram illustrating a configuration of protection circuit 22 based on the first embodiment.

Referring to FIG. 3, protection circuit 22 includes a temperature abnormal condition determination circuit 22A determining whether or not a temperature of power supply circuit 20 is normal and a voltage abnormal condition determination circuit 22B determining whether or not a power supply voltage of power supply circuit 20 is normal.

Temperature abnormal condition determination circuit 22A includes a comparator 120 and a temperature detector 122.

Temperature detector 122 outputs a voltage in accordance with a temperature.

Comparator 120 compares a voltage from temperature detector 122 with a reference value and outputs a control signal based on a result of comparison to control circuit 24.

Temperature detector 122 is used for detecting a junction temperature of power supply circuit 20 by way of example.

Specifically, when a voltage from temperature detector 122 has exceeded the reference value, comparator 120 outputs a control signal (at the "H" level) indicating that fact to control circuit 24. The reference value can be set to a value ensuring safety of power supply circuit 20.

Control circuit 24 controls on/off of an operation of power supply circuit 20 based on a control signal from comparator 120. Specifically, control circuit 24 stops an operation for power supply by power supply circuit 20 in response to an input of the control signal (at the "H" level) from comparator 120. Control circuit 24 has an operation for power supply by power supply circuit 20 continued when a control signal (at the "L" level) is input from comparator 120.

Voltage abnormal condition determination circuit 22B includes a comparator 130 and a voltage detection circuit 132.

Voltage detection circuit 132 detects a voltage from power supply circuit 20.

Comparator 130 compares a voltage from voltage detection circuit 132 with a reference value and outputs a control signal based on a result of comparison to control circuit 24.

Specifically, when a voltage from voltage detection circuit 132 has exceeded the reference value, comparator 130 outputs a control signal (at the "H" level) indicating that fact to control circuit 24. The reference value can be set to a value ensuring safety of power supply circuit 20.

Control circuit 24 controls on/off of an operation of power supply circuit 20 based on a control signal from comparator 130. Specifically, control circuit 24 stops an operation for power supply by power supply circuit 20 in response to an input of the control signal (at the "H" level") from comparator 130. Control circuit 24 has an operation for power supply by power supply circuit 20 continued when a control signal (at the "L" level) is input from comparator 130.

<B. Voltage Control Sequence>
<b1. Regulation of Voltage Level>

Figure 4:
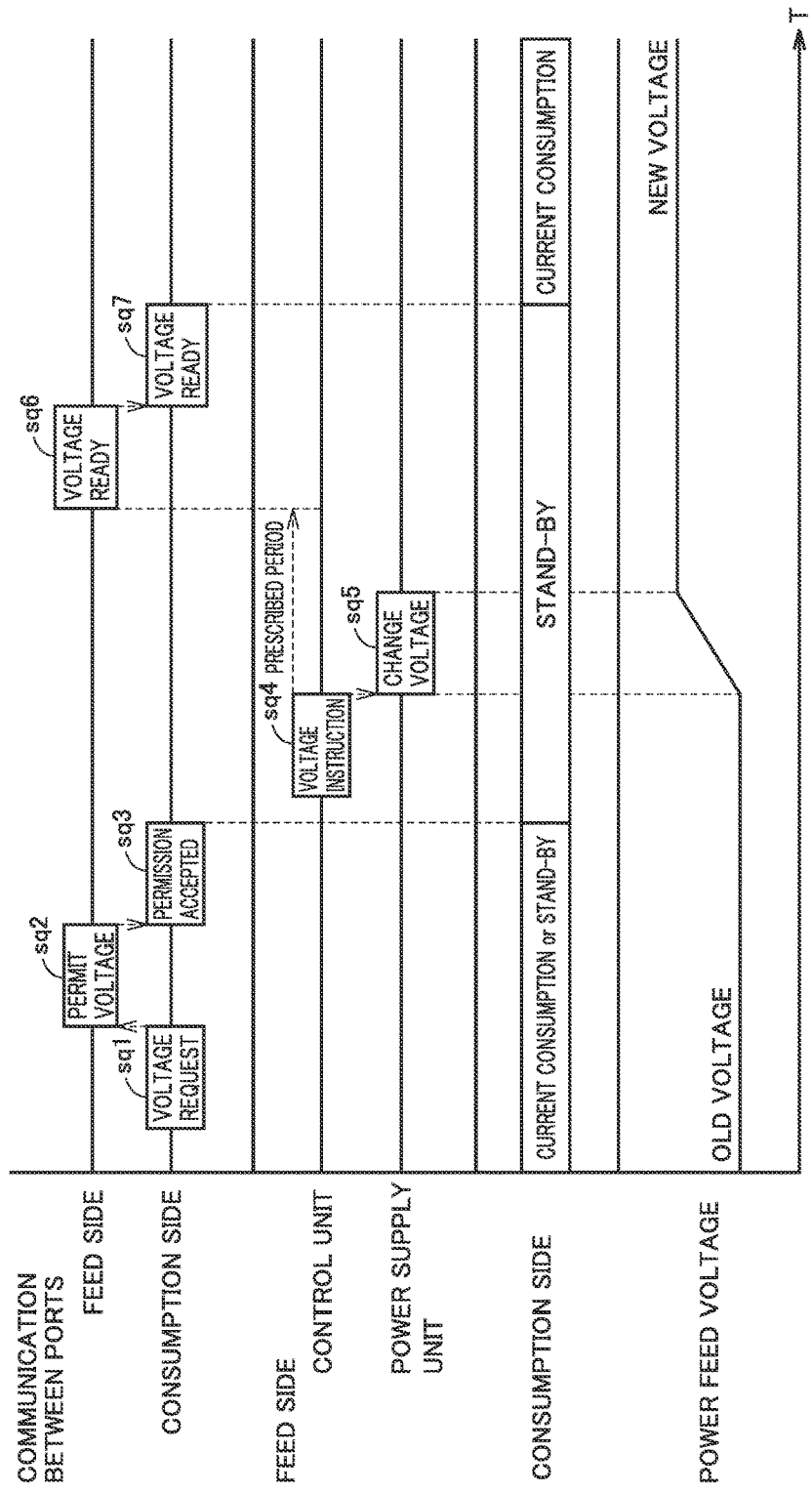
FIG. 4 is a sequence diagram when a voltage level is regulated from an old voltage to a new voltage in power supply control system 1 based on the first embodiment.

FIG. 4 is a sequence diagram when a voltage level is regulated from an old voltage to a new voltage in power supply control system 1 based on the first embodiment.

Referring to FIG. 4, power reception device 100 which is a consumption side issues a voltage request (sequence sq1). Power delivery control unit 104 issues a request to power delivery control unit 16 for a voltage necessary for power reception device 100.

Power delivery control unit 16 determines whether or not power can be fed in response to the voltage request from power reception device 100. It checks whether or not a requested value of the voltage level is within a power feed allowable range. When it is determined that the value of the requested voltage level is within the power feed allowable range, a notification that the voltage is permitted is given to power delivery control unit 104 (sequence sq2).

Power reception device 100 which is the consumption side accepts permission (sequence sq3).

Power reception device 100 is thus set to a stand-by state and waits for an instruction indicating being ready from a power feed side.

Power delivery control unit 104 outputs a notification that permission is accepted to power feed device 10, upon receiving the notification that the voltage is permitted from power feed device 10 which is a supply side.

In response, power feed device 10 starts a voltage regulation operation on a side of power feed device 10.

Power delivery control unit 16 gives a voltage instruction to power delivery power supply unit 14 (sequence sq4).

Upon receiving the voltage instruction, power delivery power supply unit 14 changes a voltage (sequence sq5). Control circuit 24 of power delivery power supply unit 14 has register 26 store information on a voltage to be supplied in voltage setting region 26A.

Power feed device 10 which is the power feed side notifies power reception device 100 which is the consumption side that a voltage is ready after lapse of a prescribed period since power delivery control unit 16 gives the voltage instruction to power delivery power supply unit 14 (sequence sq6). The prescribed period is set in advance to a period equal to or longer than a period necessary until change to a new voltage is made from issuance of the voltage instruction to power delivery power supply unit 14.

Power reception device 100 which is the consumption side accepts the voltage being ready, upon receiving a notification indicating that a voltage is ready from power feed device 10 (sequence sq7).

Power reception device 100 is thus set from the stand-by state to a current consumption state and driven upon receiving supply of a voltage from power feed device 10.

<b2. Case of System Error>

Figure 5:
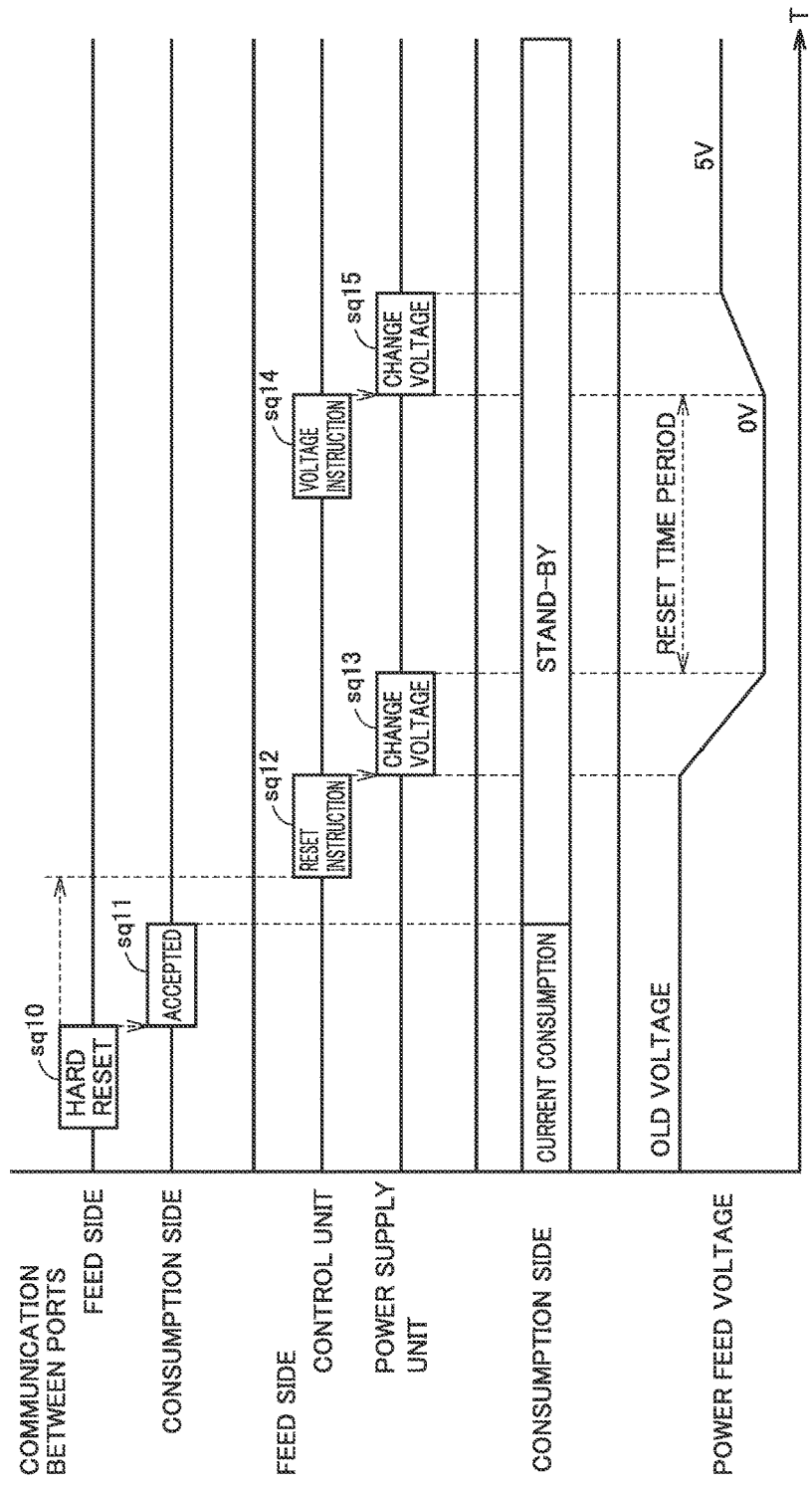
FIG. 5 is a sequence diagram for illustrating an operation at the time of a system error in power supply control system 1 based on the first embodiment.

FIG. 5 is a sequence diagram for illustrating an operation at the time of a system error in power supply control system 1 based on the first embodiment.

Referring to FIG. 5, when a system error (for example, a communication error) against power reception device 100 occurs, power feed device 10 which is the power feed side gives a hard reset notification (sequence sq10). Power delivery control unit 16 gives a hard reset notification to power delivery control unit 104.

Power reception device 100 which is the consumption side accepts the hard reset notification (sequence sq11). Power reception device 100 is thus set to the stand-by state in which supply of a voltage from power feed device 10 is awaited.

Then, power feed device 10 which is the power feed side gives a reset instruction (sequence sq12). Power delivery control unit 16 instructs power delivery power supply unit 14 to reset.

Power delivery power supply unit 14 changes a voltage upon receiving a reset instruction from power delivery control unit 16 (sequence sq13). Control circuit 24 of power delivery power supply unit 14 sets a voltage from power supply circuit 20 to 0 V upon receiving the reset instruction.

Then, power delivery control unit 16 gives a voltage instruction to power delivery power supply unit 14 (sequence sq14).

Power delivery power supply unit 14 changes a voltage upon receiving the voltage instruction (sequence sq15). Control circuit 24 of power delivery power supply unit 14 has register 26 store information on a voltage to be supplied in voltage setting region 26A. Specifically, control circuit 24 sets an initial value in voltage setting region 26A of register 26 as information on a voltage to be supplied. In the present example, 5 V is set.

<b3. Case of Abnormal Temperature>

Figure 6:
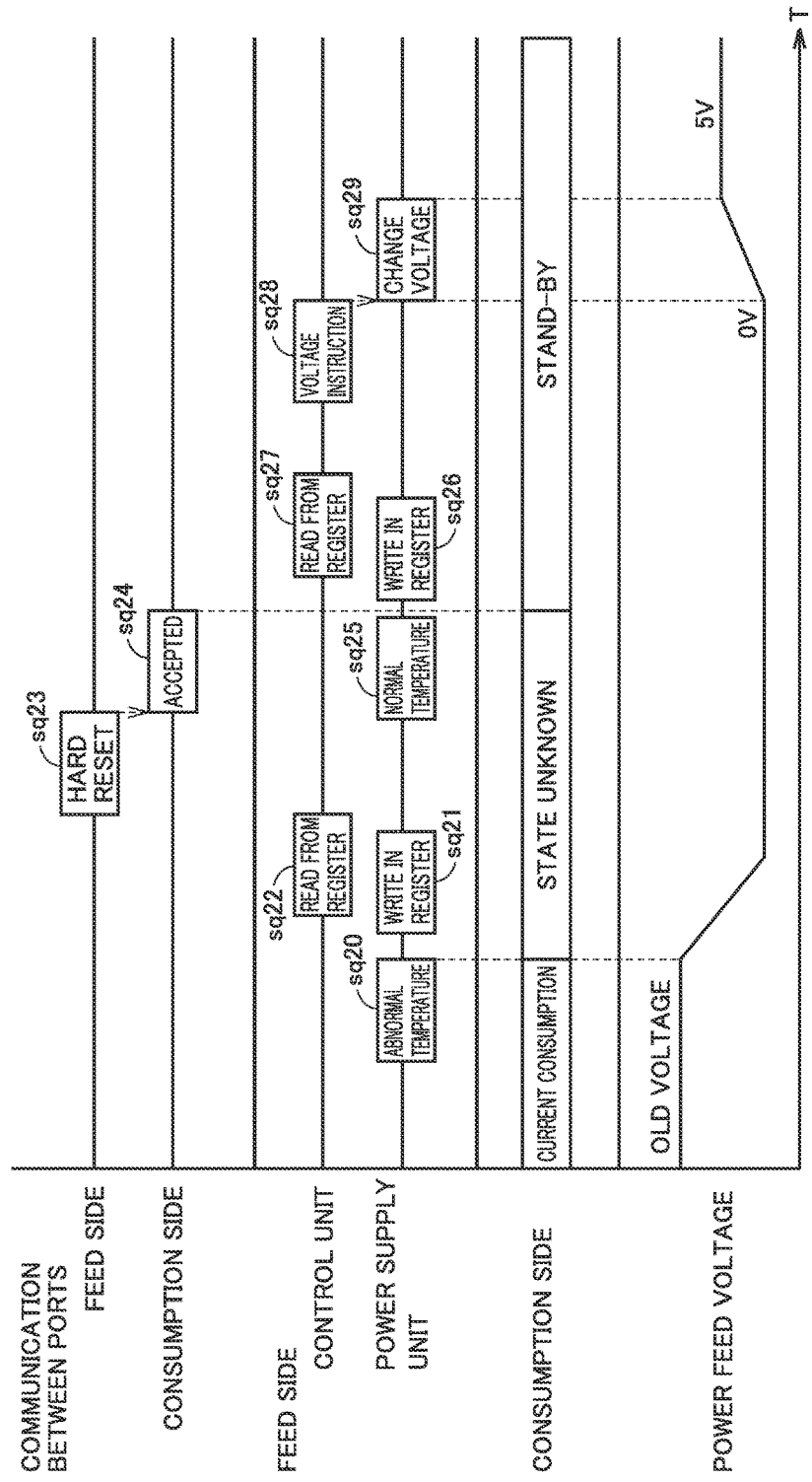
FIG. 6 is a sequence diagram for illustrating an operation in power supply control system 1 based on the first embodiment when a temperature is abnormal.

FIG. 6 is a sequence diagram for illustrating an operation in power supply control system 1 based on the first embodiment when a temperature is abnormal.

Referring to FIG. 6, it is assumed that a temperature is abnormal in power delivery power supply unit 14 (sequence sq20). Specifically, temperature abnormal condition determination circuit 22A outputs a control signal (at the "H" level") to control circuit 24 in accordance with a junction temperature of power supply circuit 20. Control circuit 24 carries out power supply off control of power supply circuit 20 and has power supply circuit 20 stop an operation for power supply. Specifically, 0 V is set.

Then, in power delivery power supply unit 14, information is written in a register (sequence sq21). Specifically, control circuit 24 writes information on an abnormal temperature in status storage region 26B of register 26.

Power delivery control unit 16 reads information from register 26 (sequence sq22). Information is read in response to an instruction from power delivery control unit 16 to power delivery power supply unit 14 every prescribed period.

Power delivery control unit 16 obtains information from register 26, confirms that a temperature is abnormal, and gives a hard reset notification (sequence sq23). Power delivery control unit 16 gives a hard reset notification to power delivery control unit 104.

Power reception device 100 which is the consumption side accepts the hard reset notification (sequence sq24). Power reception device 100 is thus set to the stand-by state in which voltage supply from power feed device 10 is awaited.

Then, it is assumed that a temperature has returned to a normal condition in power delivery power supply unit 14 (sequence sq25).

Then, in power delivery power supply unit 14, information is written in register 26 (sequence sq26). Specifically, control circuit 24 writes information on a temperature into status storage region 26B of register 26. In the present example, a value indicating that a junction temperature of power supply circuit 20 is normal is written.

Power delivery control unit 16 reads information from register 26 (sequence sq27). Information is read in response to an instruction from power delivery control unit 16 to power delivery power supply unit 14 every prescribed period.

Power delivery control unit 16 obtains information from register 26, confirms that a temperature is normal, and gives a voltage instruction to power delivery power supply unit 14 (sequence sq28).

Power delivery power supply unit 14 changes a voltage upon receiving the voltage instruction (sequence sq29). Control circuit 24 of power delivery power supply unit 14 has register 26 store information on a voltage to be supplied in voltage setting region 26A. Specifically, control circuit 24 sets an initial value as information on a voltage to be supplied in voltage setting region 26A of register 26. In the present example, 5 V is set.

<b4. Case of Abnormal Voltage>

Figure 7:
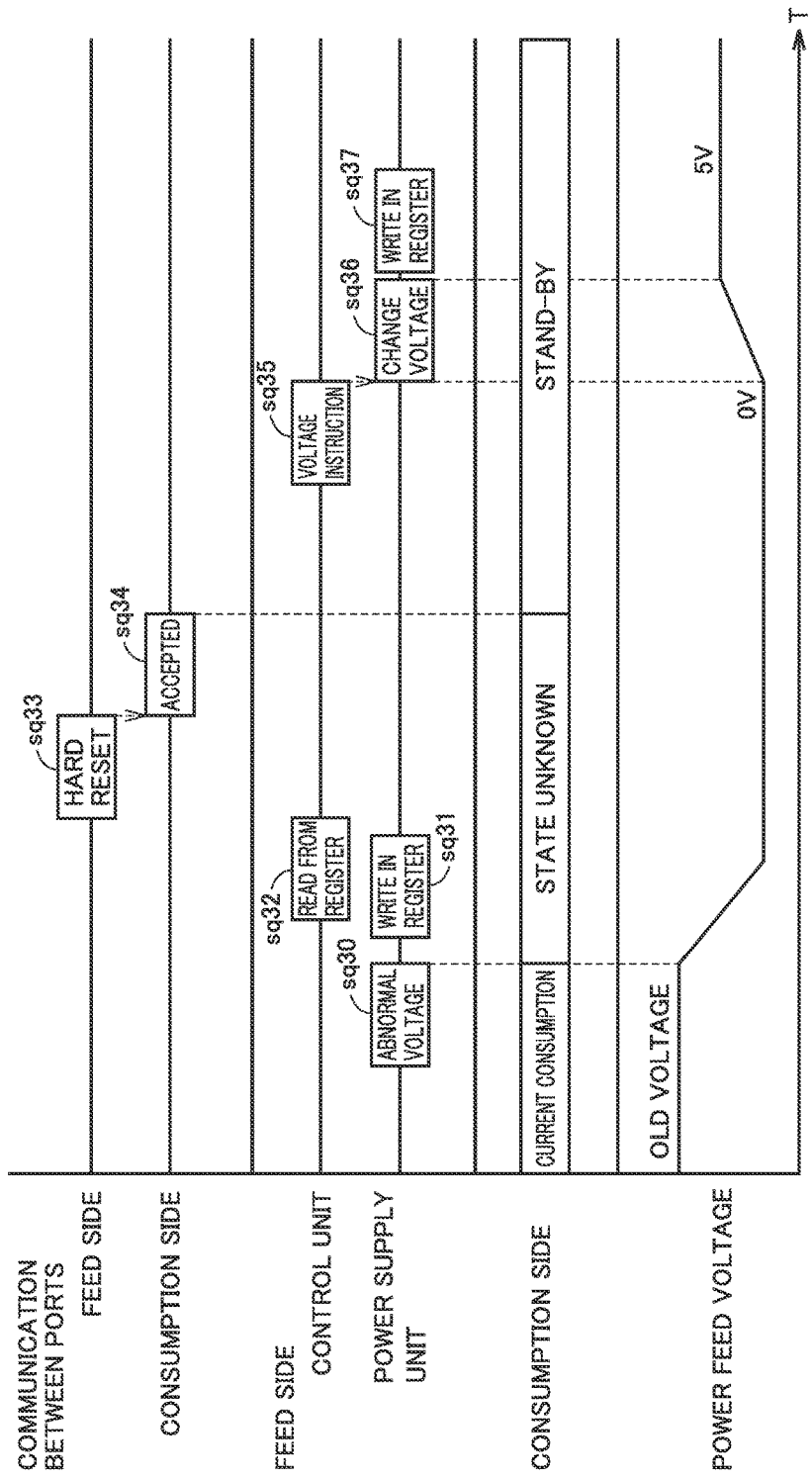
FIG. 7 is a sequence diagram for illustrating an operation in power supply control system 1 based on the first embodiment when a voltage is abnormal.

FIG. 7 is a sequence diagram for illustrating an operation in power supply control system 1 based on the first embodiment when a voltage is abnormal.

Referring to FIG. 7, it is assumed that a voltage is abnormal in power delivery power supply unit 14 (sequence sq30). Specifically, voltage abnormal condition determination circuit 22B outputs a control signal (at the "H" level) to control circuit 24 when a voltage from voltage detection circuit 132 exceeds a reference value. Control circuit 24 carries out power supply off control of power supply circuit 20 and has power supply circuit 20 stop an operation for power supply. Specifically, 0 V is set.

Then, in power delivery power supply unit 14, information is written in register 26 (sequence sq31). Specifically, control circuit 24 writes information on an abnormal voltage in status storage region 26B of register 26.

Power delivery control unit 16 reads information from register 26 (sequence sq32). Information is read in response to an instruction from power delivery control unit 16 to power delivery power supply unit 14 every prescribed period.

Power delivery control unit 16 obtains information from register 26, confirms that a voltage is abnormal, and gives a hard reset notification (sequence sq33). Power delivery control unit 16 gives a hard reset notification to power delivery control unit 104.

Power reception device 100 which is the consumption side accepts the hard reset notification (sequence sq34).

Power reception device 100 is thus set to the stand-by state in which voltage supply from power feed device 10 is awaited.

Then, power delivery control unit 16 gives a voltage instruction to power delivery power supply unit 14 (sequence sq35).

Power delivery power supply unit 14 changes a voltage upon receiving the voltage instruction (sequence sq36). Control circuit 24 of power delivery power supply unit 14 has register 26 store information on a voltage to be supplied in voltage setting region 26A. Specifically, control circuit 24 sets an initial value as information on a voltage to be supplied in voltage setting region 26A of register 26. In the present example, 5 V is set.

Power delivery power supply unit 14 writes information in register 26 (sequence sq37). Specifically, control circuit 24 resets information indicating an abnormal voltage stored in status storage region 26B of register 26.

Therefore, in the case of an abnormal voltage, when an abnormal condition is sensed, an operation for power supply by power supply circuit 20 is stopped, however, the abnormal condition may be temporary. Therefore, an operation for stopping an operation for power supply and thereafter resuming an operation for supply of a voltage is repeated.

<C. Control Flow>

<c1. Regulation of Voltage Level>

Figure 8:
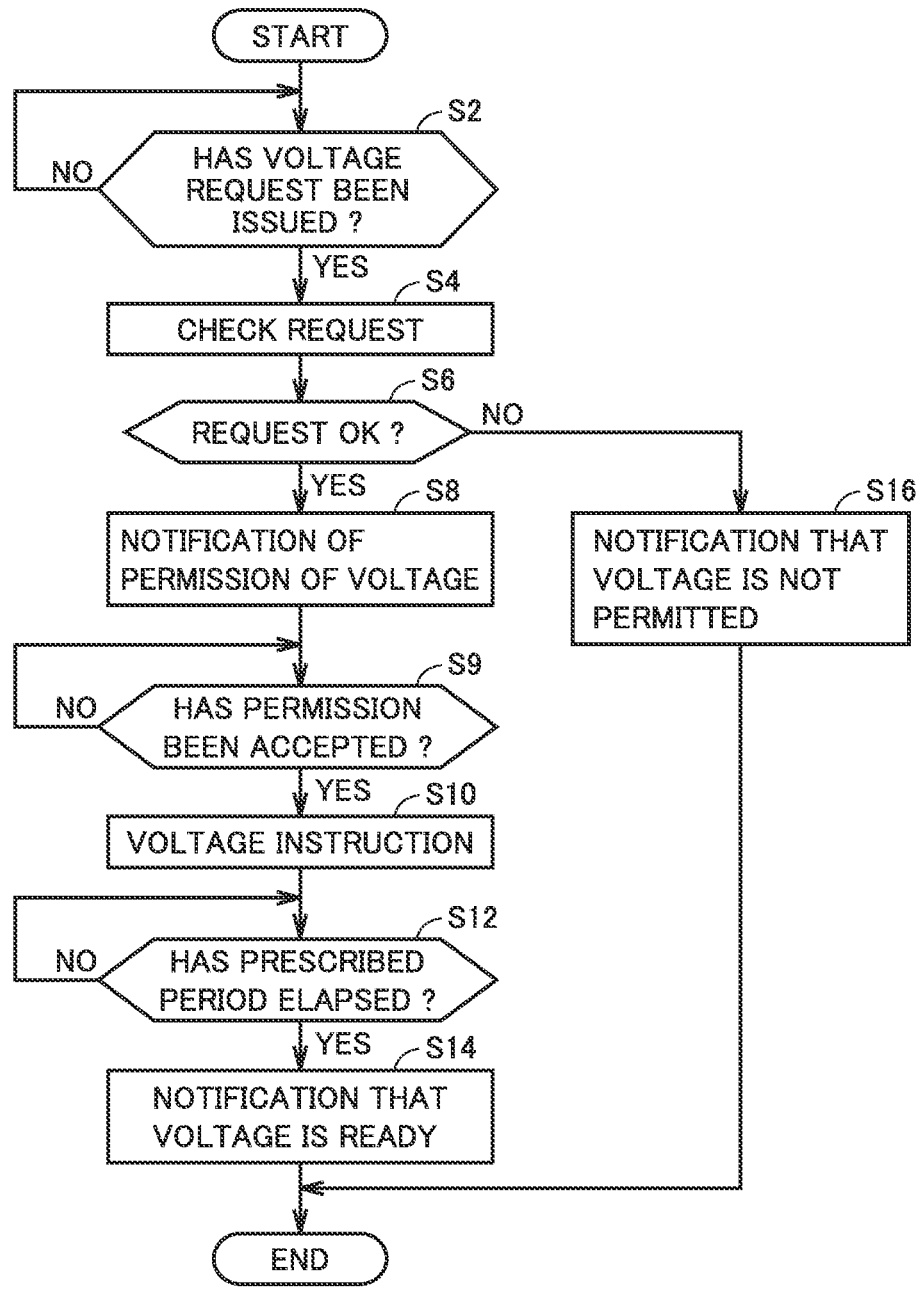
FIG. 8 is a flowchart when processing for regulating a voltage level in a power delivery control unit 16 based on the first embodiment is performed.

FIG. 8 is a flowchart when processing for regulating a voltage level in power delivery control unit 16 based on the first embodiment is performed.

Referring to FIG. 8, power delivery control unit 16 determines whether or not a voltage request has been issued from power reception device 100 which is the consumption side (step S2).

When a voltage request has not been issued from power reception device 100 which is the consumption side in step S2 (NO in step S2), power delivery control unit 16 does not have to regulate a voltage level and a state in step S2 is maintained.

When a voltage request has been issued from power reception device 100 which is the consumption side in step S2 (YES in step S2), power delivery control unit 16 checks a voltage request for power feed (step S4).

Then, power delivery control unit 16 determines whether or not a voltage request is OK (step S6). Specifically, power delivery control unit 16 determines whether or not power can be fed in response to the voltage request from power reception device 100. Whether or not a value of a requested voltage level is within a power feed allowable range is checked.

Then, when power delivery control unit 16 determines that a voltage request is OK (YES in step S6), it gives a notification that a voltage is permitted (step S8). Power delivery control unit 16 notifies power delivery control unit 104 of power reception device 100 which is the consumption side that the voltage is permitted. Power reception device 100 is thus set to the stand-by state and waits for an instruction indicating being ready from the power feed side.

Then, power delivery control unit 16 determines whether or not it has received a notification that permission is accepted (step S9).

Power delivery control unit 16 maintains step S9 until it receives a notification that permission is accepted, and when it determines that it has received such a notification (YES in step S9), it gives a voltage instruction to power delivery power supply unit 14 (step S10). Power delivery power supply unit 14 changes a voltage upon receiving the voltage instruction.

Then, power delivery control unit 16 determines whether or not a prescribed period has elapsed (step S12). The prescribed period is set in advance to a period equal to or longer than a period necessary until change to a new voltage is made from issuance of the voltage instruction to power delivery power supply unit 14.

When power delivery control unit 16 determines that the prescribed period has elapsed (YES in step S12), it notifies power reception device 100 which is the consumption side that the voltage is ready (step S14). Then, the process ends (end).

Thus, power reception device 100 accepts the voltage being ready, makes transition from the stand-by state to a current consumption state, and is driven upon receiving supply of a voltage from power feed device 10.

When power delivery control unit 16 determines in step S6 that a voltage request is not OK (NO in step S6), it gives a notification that a voltage is not permitted (not permitted) (step S16).

Then, the process ends (end). In this case, requested power supply to power reception device 100 is not started.

<c2. Operation for Regulating Voltage of Power Delivery Power Supply Unit 14>

Figure 9:
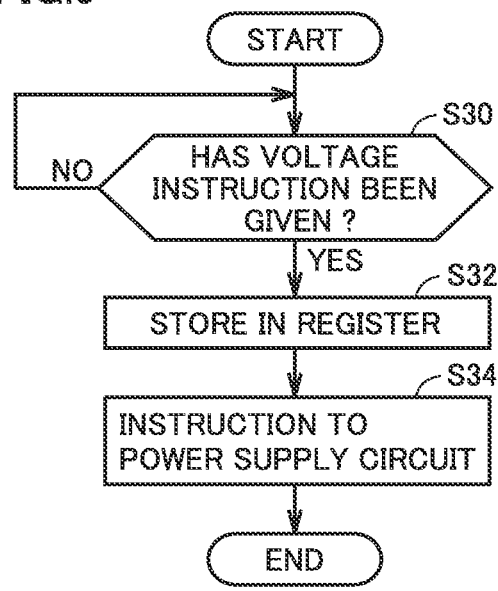
FIG. 9 is a flowchart illustrating an operation for regulating a voltage in a power delivery power supply unit 14 based on the first embodiment.

FIG. 9 is a flowchart illustrating an operation for regulating a voltage in power delivery power supply unit 14 based on the first embodiment. An operation of control circuit 24 of power delivery power supply unit 14 will be described.

Referring to FIG. 9, control circuit 24 determines whether or not a voltage instruction has been received from power delivery control unit 16 (step S30).

In step S30, control circuit 24 maintains a state until a voltage instruction is received from power delivery control unit 16, and when it receives the voltage instruction (YES in step S30), it has register 26 store information (step S32). Specifically, information is stored in voltage setting region 26A of register 26.

Then, control circuit 24 instructs power supply circuit 20 to output an indicated voltage (step S34). Power supply circuit 20 regulates a level of a power supply voltage generated in accordance with the instruction from control circuit 24 until a target voltage is attained.

Then, the process ends (end).

<c3. Operation of Power Delivery Power Supply Unit 14 when Temperature is Abnormal>

Figure 10:
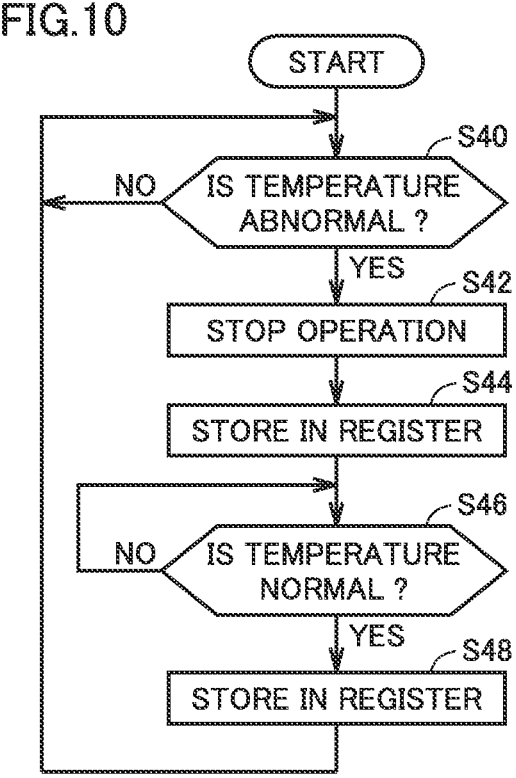
FIG. 10 is a flowchart illustrating an operation of power delivery power supply unit 14 based on the first embodiment when a temperature is abnormal.

FIG. 10 is a flowchart illustrating an operation of power delivery power supply unit 14 based on the first embodiment when a temperature is abnormal. An operation of control circuit 24 of power delivery power supply unit 14 will be described.

Referring to FIG. 10, control circuit 24 determines whether or not a temperature is abnormal (step S40). Control circuit 24 determines whether or not a control signal (at the "H" level) is input from temperature abnormal condition determination circuit 22A.

In step S40, control circuit 24 maintains a state until it determines that a temperature is abnormal, and when it determines that a temperature is abnormal (YES in step S40), it stops an operation (step S42). Control circuit 24 carries out power supply off control and instructs power supply circuit 20 to stop an operation for power supply. Specifically, 0 V is set.

Then, control circuit 24 has register 26 store information (step S44). Specifically, control circuit 24 has information stored in status storage region 26B of register 26. Specifically, information indicating that a temperature is abnormal is stored.

Then, control circuit 24 determines whether or not a temperature is normal (step S46). Control circuit 24 determines whether or not a control signal (at the "L" level) is input from temperature abnormal condition determination circuit 22A.

In step S46, control circuit 24 maintains a state until it determines that a temperature is normal, and when it determines that a temperature is normal (YES in step S46), it has register 26 store information (step S48). Specifically, information is stored in status storage region 26B of register 26. Specifically, information indicating that a temperature is normal is stored.

Then, the process returns to step S40.

<c4. Recovery Operation when Temperature is Abnormal>

Figure 11:
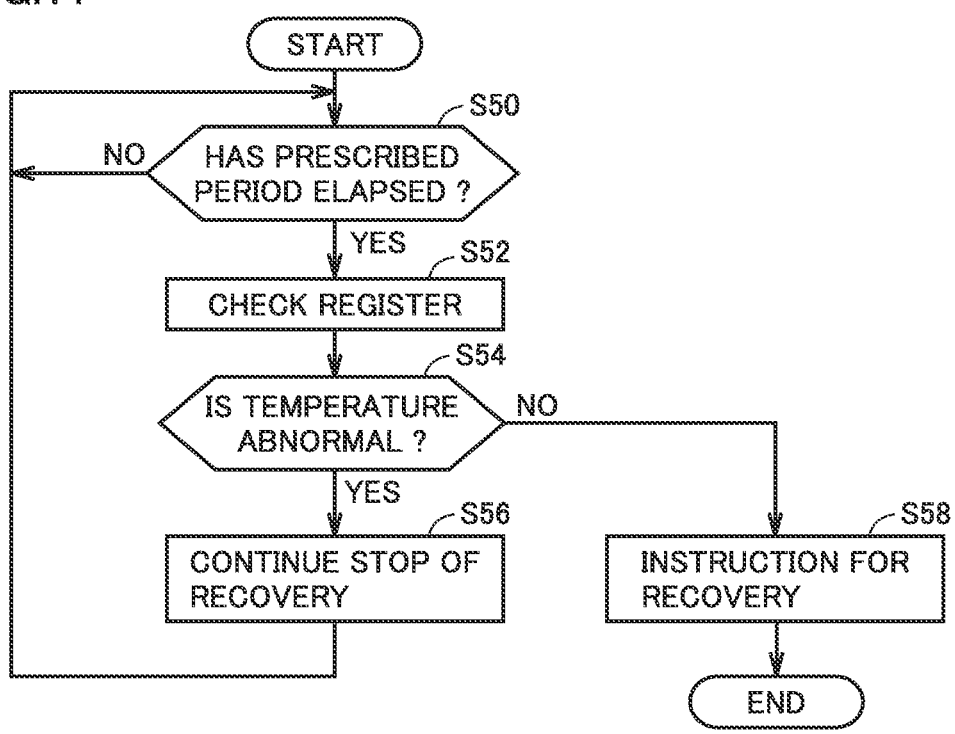
FIG. 11 is a flowchart illustrating a recovery operation of power delivery control unit 16 based on the first embodiment when a temperature is abnormal.

FIG. 11 is a flowchart illustrating a recovery operation of power delivery control unit 16 based on the first embodiment when a temperature is abnormal. An operation in microcomputer 34 of power delivery control unit 16 will mainly be described.

Referring to FIG. 11, power delivery control unit 16 determines whether or not a prescribed period has elapsed (step S50). In the present example, power delivery control unit 16 checks information in register 26 every prescribed period.

When power delivery control unit 16 determines that a prescribed period has elapsed (YES in step S50), it checks register 26 (step S52). Specifically, microcomputer 34 requests information in register 26, and checks information stored in status storage region 26B of register information transmitted from power delivery power supply unit 14 in response to the request.

Then, power delivery control unit 16 determines whether or not a temperature is abnormal as information in register 26 (step S54). Specifically, microcomputer 34 determines whether or not there is information that a temperature is abnormal in status storage region 26B of register 26.

Then, when power delivery control unit 16 determines in step S54 that a temperature is abnormal (YES in step S54), it has stop of recovery continued (step S56). In this case, microcomputer 34 does not give a voltage instruction to power delivery power supply unit 14.

Then, the process returns to step S50 and whether or not a prescribed period has elapsed is determined (step S50).

When power delivery control unit 16 determines in step S54 that a temperature is normal (NO in step S54), it indicates recovery (step S58). In this case, microcomputer 34 gives a voltage instruction to power delivery power supply unit 14. Power delivery power supply unit 14 changes a voltage in response to the voltage instruction and performs a recovery operation.

Then, the process ends (end).

Therefore, when a temperature has reliably become low, a recovery operation can be performed based on information for determining whether or not a temperature is normal stored in register 26.

Therefore, an operation appropriate in accordance with an abnormal condition can be performed on power supply circuit 20 based on information stored in status storage region 26B of register 26. Safety of power supply circuit 20 can thus be enhanced.

<c5. Operation of Power Delivery Power Supply Unit 14 when Voltage is Abnormal>

Figure 12:
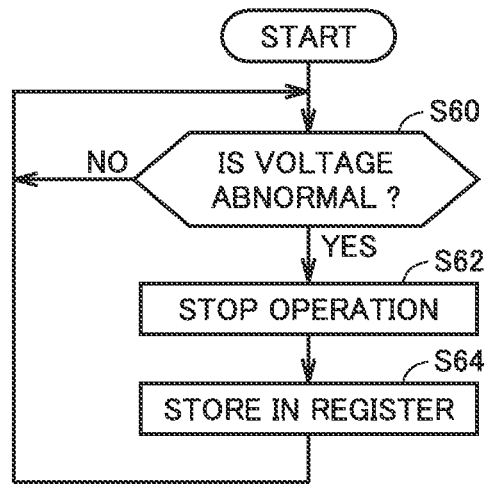
FIG. 12 is a flowchart illustrating an operation of power delivery power supply unit 14 based on the first embodiment when a voltage is abnormal.

FIG. 12 is a flowchart illustrating an operation of power delivery power supply unit 14 based on the first embodiment when a voltage is abnormal. An operation of control circuit 24 of power delivery power supply unit 14 will be described.

Referring to FIG. 12, control circuit 24 determines whether or not a voltage is abnormal (step S60). Control circuit 24 determines whether or not a control signal (at the "H" level) is input from voltage abnormal condition determination circuit 22B.

In step S60, control circuit 24 maintains a state until it determines that a voltage is abnormal, and when it determines that a voltage is abnormal (YES in step S60), it stops an operation (step S62). Control circuit 24 carries out power supply off control and instructs power supply circuit 20 to stop an operation for power supply by power supply circuit 20. Specifically, 0 V is set.

Then, control circuit 24 has register 26 store information (step S64). Specifically, control circuit 24 has information stored in status storage region 26B of register 26. Specifically, information indicating that a voltage is abnormal is stored.

Then, the process returns to step S60.

<c6. Recovery Operation when Voltage is Abnormal>

Figure 13:
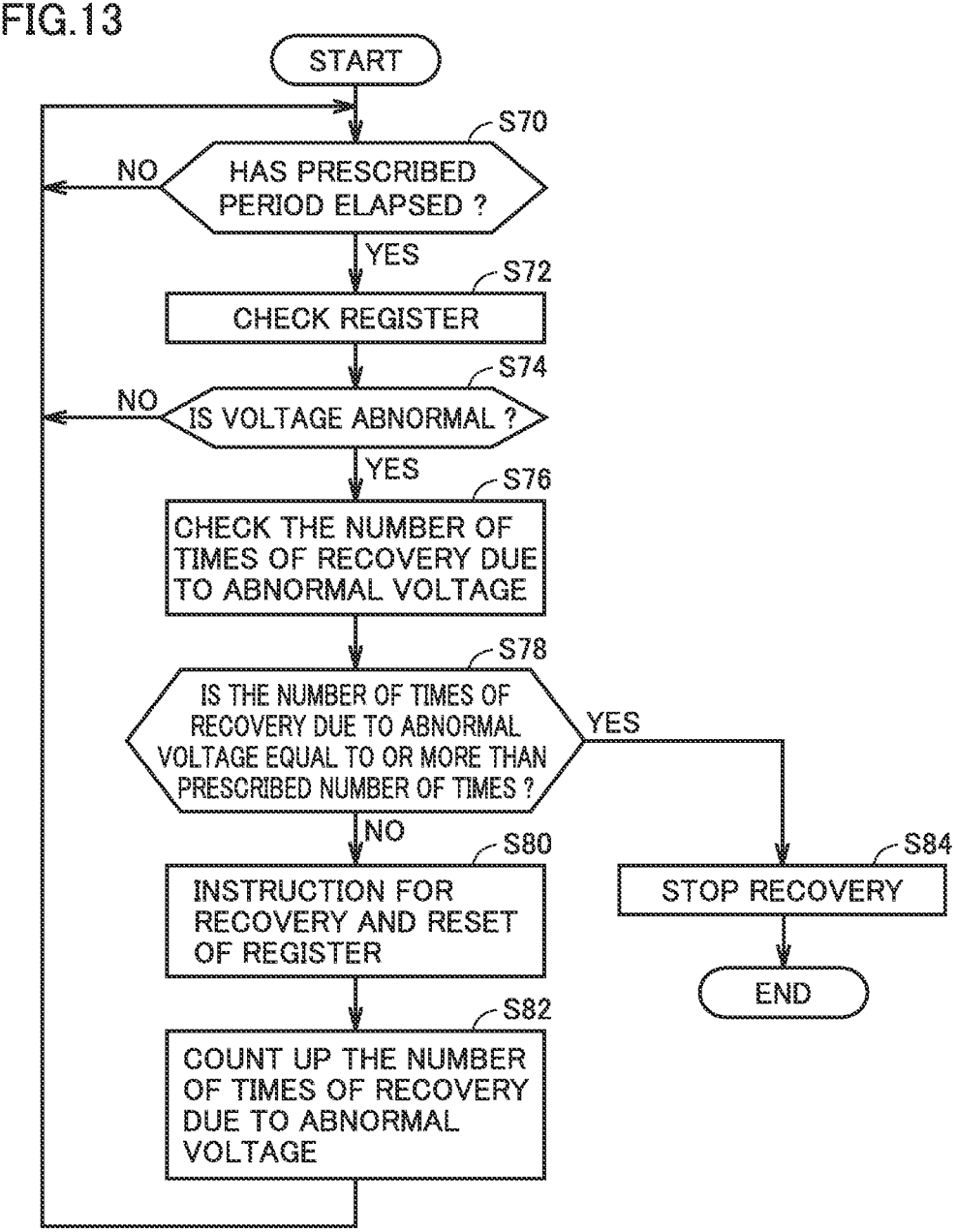
FIG. 13 is a flowchart illustrating a recovery operation of power delivery control unit 16 based on the first embodiment when a voltage is abnormal.

FIG. 13 is a flowchart illustrating a recovery operation of power delivery control unit 16 based on the first embodiment when a voltage is abnormal. An operation in microcomputer 34 of power delivery control unit 16 will mainly be described.

Referring to FIG. 13, power delivery control unit 16 determines whether or not a prescribed period has elapsed (step S70). In the present example, power delivery control unit 16 checks information in register 26 every prescribed period.

When power delivery control unit 16 determines that the prescribed period has elapsed (YES in step S70), it checks register 26 (step S72). Specifically, microcomputer 34 requests information in register 26 and checks information stored in status storage region 26B of register information transmitted from power delivery power supply unit 14 in response to the request.

Then, power delivery control unit 16 determines whether or not a voltage is abnormal as information in register 26 (step S74). Specifically, microcomputer 34 determines whether or not there is information that a voltage is abnormal in status storage region 26B of register 26.

When power delivery control unit 16 determines in step S74 that a voltage is normal (NO in step S74), the process returns to step S70.

When power delivery control unit 16 determines in step S74 that a voltage is abnormal (YES in step S74), it checks the number of times of recovery due to an abnormal voltage (step S76). The number of times of recovery due to the abnormal voltage is stored in memory 36 of power delivery control unit 16. Microcomputer 34 obtains the number of times of recovery due to the abnormal voltage stored in memory 36.

Then, power delivery control unit 16 determines whether or not the number of times of recovery due to the abnormal voltage is equal to or more than a prescribed number of times (step S78). Microcomputer 34 determines whether or not the number of times of recovery due to the abnormal voltage stored in memory 36 is equal to or more than the prescribed number of times.

When it is determined in step S78 that the number of times of recovery due to the abnormal voltage is less than the prescribed number of times (NO in step S78), recovery is indicated and register 26 is reset (step S80). Specifically, microcomputer 34 gives a voltage instruction to power delivery power supply unit 14. Power delivery power supply unit 14 changes a voltage in response to the voltage instruction and performs a recovery operation. An instruction to reset information on the abnormal voltage is given to power delivery power supply unit 14. Thus, information indicating the abnormal voltage stored in status storage region 26B of register 26 of power delivery power supply unit 14 is reset.

Then, power delivery control unit 16 counts up the number of times of recovery due to the abnormal voltage (step S82). Microcomputer 34 of power delivery control unit 16 stores a value resulting from count-up as the number of times of recovery due to the abnormal voltage in memory 36.

Then, the process returns to step S70.

When it is determined in step S78 that the number of times of recovery due to the abnormal voltage is equal to or more than the prescribed number of times (YES in step S78), recovery is stopped (step S84).

Then, the process ends (end). Specifically, microcomputer 34 quits the process without giving a voltage instruction to power delivery power supply unit 14. Therefore, in this case, a recovery operation is not performed.

In the present example, when the number of times of recovery is less than a prescribed number of times, an abnormal voltage may merely be sporadic and hence a recovery operation is performed. When the number of times of recovery is equal to or more than the prescribed number of times, an abnormal voltage is not merely sporadic but there may be another reason for a failure (such as short-circuiting) and hence a recovery operation is not performed.

Therefore, an operation appropriate in accordance with an abnormal condition can be performed on power supply circuit 20 based on information stored in status storage region 26B of register 26. Thus, safety of power supply circuit 20 can be enhanced.

<Modification>

<b5. Another Example when Temperature is Abnormal>

Figure 14:
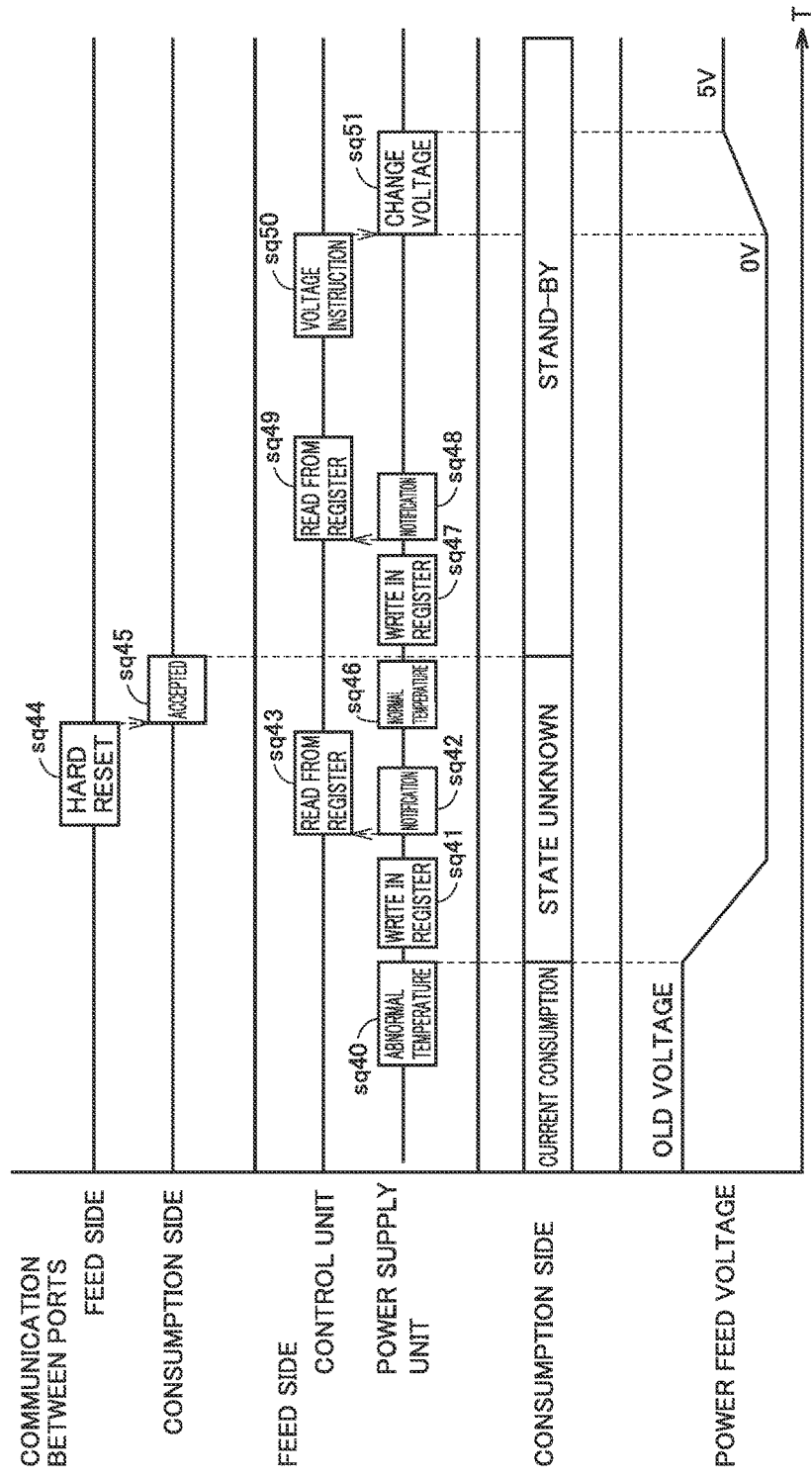
FIG. 14 is a sequence diagram for illustrating an operation in power supply control system 1 based on a modification of the first embodiment when a temperature is abnormal.

FIG. 14 is a sequence diagram for illustrating an operation in power supply control system 1 based on a modification of the first embodiment when a temperature is abnormal. In the present modification, a notification signal is output from power delivery power supply unit 14 to power delivery control unit 16.

Referring to FIG. 14, it is assumed that a temperature is abnormal in power delivery power supply unit 14 (sequence sq40). Specifically, temperature abnormal condition determination circuit 22A outputs a control signal (at the "H" level) to control circuit 24 in accordance with a junction temperature of power supply circuit 20.

Control circuit 24 carries out power supply off control of power supply circuit 20 and stops an operation for power supply by power supply circuit 20. Specifically, 0 V is set.

Then, in power delivery power supply unit 14, information is written in a register (sequence sq41). Specifically, control circuit 24 writes information on an abnormal temperature in status storage region 26B of register 26.

Then, power delivery power supply unit 14 performs processing for giving a notification to power delivery control unit 16. Specifically, control circuit 24 outputs an interrupt notification signal to power delivery control unit 16 (sequence sq42).

Then, upon receiving the interrupt notification signal, power delivery control unit 16 reads information from register 26 (sequence sq43). Power delivery control unit 16 issues a request to power delivery power supply unit 14 for information in register 26 in response to the interrupt notification signal.

Power delivery control unit 16 obtains information from register 26, confirms that a temperature is abnormal, and gives a hard reset notification (sequence sq44). Power delivery control unit 16 gives a hard reset notification to power delivery control unit 104.

Power reception device 100 which is the consumption side accepts the hard reset notification (sequence sq45). Power reception device 100 is thus set to the stand-by state in which supply of a voltage from power feed device 10 is awaited.

Then, it is assumed that a temperature has returned to a normal condition in power delivery power supply unit 14 (sequence sq46).

Then, in power delivery power supply unit 14, information is written in register 26 (sequence sq47). Specifically, control circuit 24 writes information on a temperature into status storage region 26B of register 26. In the present example, a value indicating that a junction temperature of power supply circuit 20 is normal is written.

Then, power delivery power supply unit 14 performs processing for giving a notification to power delivery control unit 16. Specifically, control circuit 24 outputs an interrupt notification signal to power delivery control unit 16 (sequence sq48).

Upon receiving the interrupt notification signal, power delivery control unit 16 reads information from register 26 (sequence sq49). Power delivery control unit 16 requests information in register 26 of power delivery power supply unit 14 in response to the interrupt notification signal.

Power delivery control unit 16 obtains information from register 26, confirms that a temperature is normal, and gives a voltage instruction to power delivery power supply unit 14 (sequence sq50).

Upon receiving the voltage instruction, power delivery power supply unit 14 changes a voltage (sequence sq51). Control circuit 24 of power delivery power supply unit 14 has register 26 store information on a voltage to be supplied in voltage setting region 26A. Specifically, control circuit 24 sets an initial value as information on a voltage to be supplied in voltage setting region 26A of register 26. In the present example, 5 V is set.

In the present modification, an interrupt notification signal which notifies power delivery control unit 16 of the fact that writing in register 26 has been performed is output in writing in register 26 of power delivery power supply unit 14. Thus, it is not necessary to obtain information in register 26 every prescribed period but information in register 26 should only be obtained in response to input of the interrupt notification signal. Therefore, load in monitoring of information in register 26 in power delivery control unit 16 is mitigated.

<c7. Another Operation of Power Delivery Power Supply Unit 14 when Temperature is Abnormal>

Figure 15:
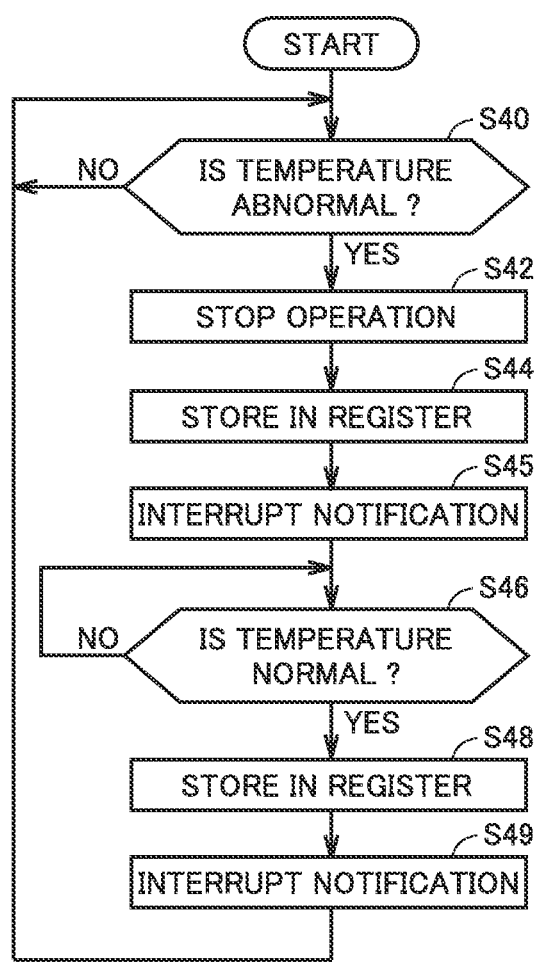
FIG. 15 is a flowchart illustrating an operation of power delivery power supply unit 14 based on the modification of the first embodiment when a temperature is abnormal.

FIG. 15 is a flowchart illustrating an operation of power delivery power supply unit 14 based on the modification of the first embodiment when a temperature is abnormal. An operation of control circuit 24 of power delivery power supply unit 14 will be described.

FIG. 15 is different from the flowchart in FIG. 10 in addition of steps S45 and S49.

After information is stored in register 26 in step S44, power delivery power supply unit 14 issues an interrupt signal to power delivery control unit 16 (step S45). Specifically, control circuit 24 outputs an interrupt notification signal to power delivery control unit 16.

After information is stored in register 26 in step S48, power delivery power supply unit 14 issues an interrupt signal to power delivery control unit 16 (step S49). Specifically, control circuit 24 outputs an interrupt notification signal to power delivery control unit 16.

Then, the process returns to step S40. Since other portions are the same as in the flowchart in FIG. 10, detailed description thereof will not be repeated.

<c8. Another Recovery Operation when Temperature is Abnormal>

Figure 16:
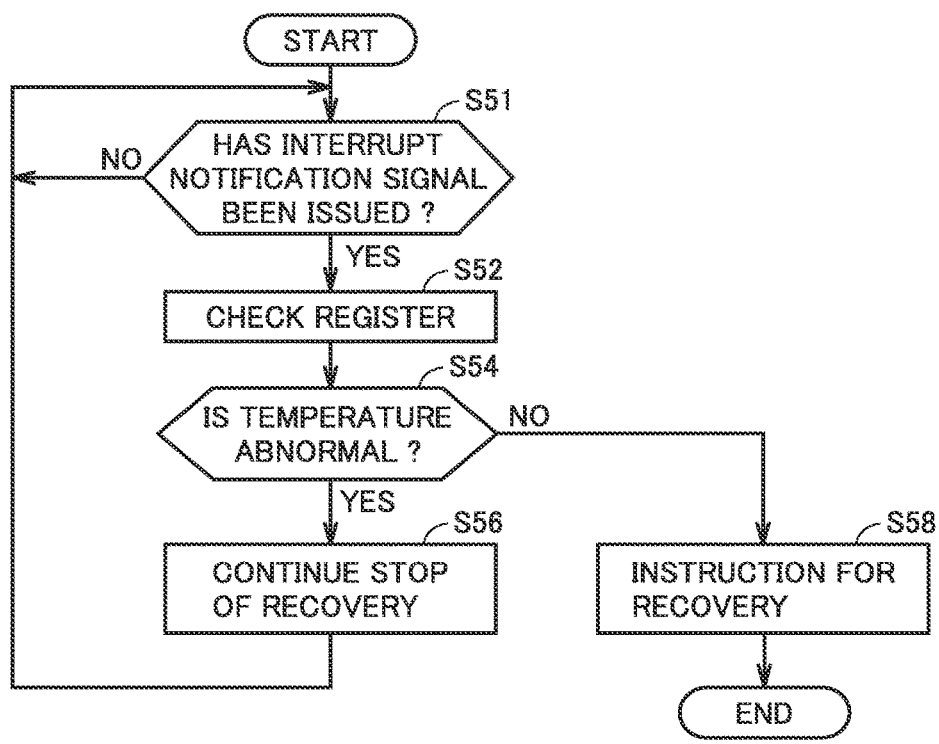
FIG. 16 is a flowchart illustrating a recovery operation of power delivery control unit 16 based on the modification of the first embodiment when a temperature is abnormal.

FIG. 16 is a flowchart illustrating a recovery operation of power delivery control unit 16 based on the modification of the first embodiment when a temperature is abnormal. An operation in microcomputer 34 of power delivery control unit 16 will mainly be described.

FIG. 16 is different from the flowchart in FIG. 11 in replacement of step S50 with step S51.

Specifically, power delivery control unit 16 determines whether or not an interrupt notification signal has been issued (step S51). In the present example, microcomputer 34 of power delivery control unit 16 determines whether or not an interrupt notification signal has been received from power delivery power supply unit 14.

Power delivery control unit 16 maintains a state in step S51 until an interrupt notification signal is issued, and when it determines that the interrupt notification signal has been issued (YES in step S51), it checks register 26 (step S52). Specifically, microcomputer 34 requests information in register 26 and checks register information stored in status storage region 26B of register information transmitted from power delivery power supply unit 14 in response to the request.

Since other portions are the same as in the flowchart in FIG. 11, detailed description thereof will not be repeated.

Though issuance of an interrupt signal when a temperature is abnormal has been described above, it can also similarly be applicable to an abnormal voltage.

<c9. Another Operation of Power Delivery Power Supply Unit 14 when Voltage is Abnormal>

Figure 17:
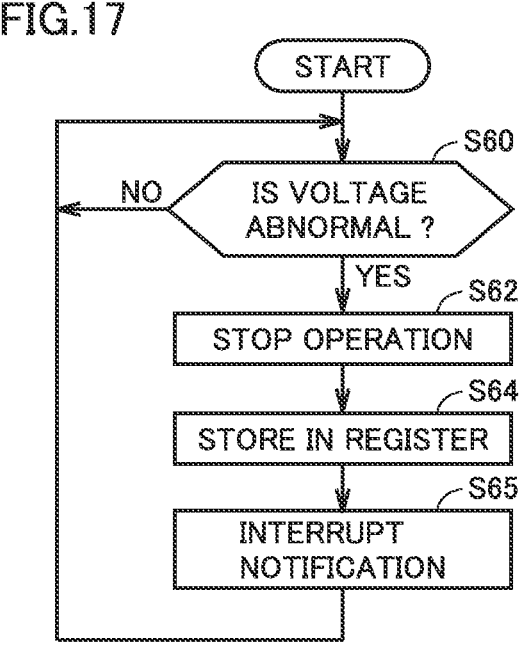
FIG. 17 is a flowchart illustrating an operation of power delivery power supply unit 14 based on the modification of the first embodiment when a voltage is abnormal.

FIG. 17 is a flowchart illustrating an operation of power delivery power supply unit 14 based on the modification of the first embodiment when a voltage is abnormal. An operation of control circuit 24 of power delivery power supply unit 14 will be described.

FIG. 17 is different from the flowchart in FIG. 12 in addition of step S65.

After information is stored in register 26 in step S64, control circuit 24 issues an interrupt signal to power delivery control unit 16 (step S65). Specifically, control circuit 24 outputs an interrupt notification signal to power delivery control unit 16.

Then, the process returns to step S60. Since other portions are the same as in the flowchart in FIG. 12, detailed description thereof will not be repeated.

<c10. Another Recovery Operation when Voltage is Abnormal>

Figure 18:
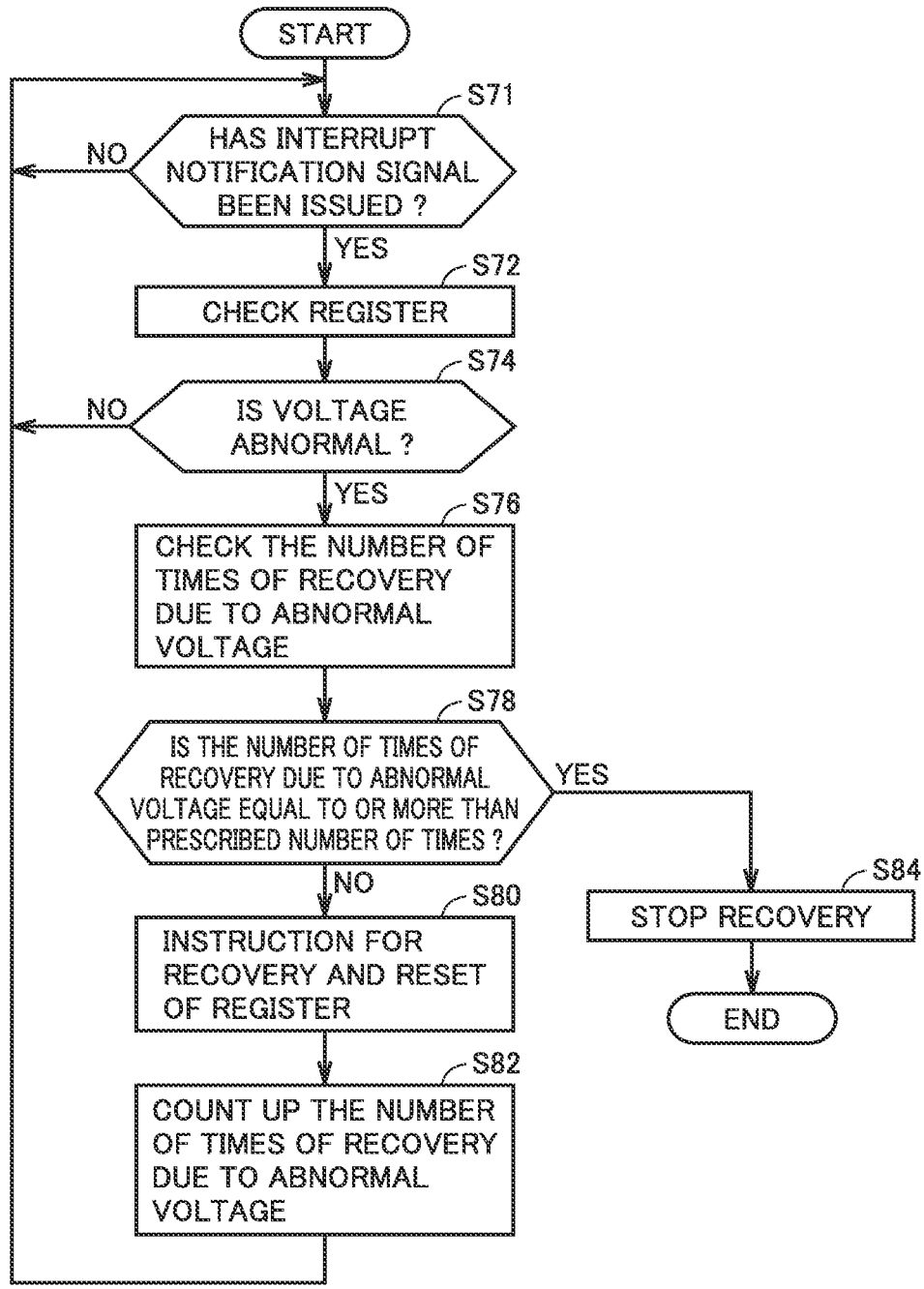
FIG. 18 is a flowchart illustrating a recovery operation of power delivery control unit 16 based on the modification of the first embodiment when a voltage is abnormal.

FIG. 18 is a flowchart illustrating a recovery operation of power delivery control unit 16 based on the modification of the first embodiment when a voltage is abnormal. An operation in microcomputer 34 of power delivery control unit 16 will mainly be described.

FIG. 18 is different from the flowchart in FIG. 13 in replacement of step S70 with step S71.

Specifically, power delivery control unit 16 determines whether or not an interrupt notification signal has been issued (step S71). In the present example, microcomputer 34 of power delivery control unit 16 determines whether or not an interrupt notification signal has been received from power delivery power supply unit 14.

Power delivery control unit 16 maintains a state in step S71 until an interrupt notification signal is issued, and when it determines that the interrupt notification signal has been issued (YES in step S71), it checks register 26 (step S72). Specifically, microcomputer 34 requests information in register 26 and checks information stored in status storage region 26B of register information transmitted from power delivery power supply unit 14 in response to the request.

Since other portions are the same as in the flowchart in FIG. 13, detailed description thereof will not be repeated.

In the present modification, an interrupt notification signal which notifies power delivery control unit 16 that writing in register 26 has been performed is output in writing in register 26 of power delivery power supply unit 14. Thus, it is not necessary to obtain information in register 26 every prescribed period but information in register 26 should only be obtained in response to input of the interrupt notification signal. Therefore, load in monitoring of information in register 26 in power delivery control unit 16 is mitigated.

<Other Forms>

Though a configuration in power reception device 100 in which supply of a power supply voltage is received from power feed device 10 has been described, power reception device 100 can also include power delivery power supply unit 14 as in power feed device 10. Power reception device 100 can also have a function as power feed device 10 and can also be configured to supply a power supply voltage to yet another USB device.

Second Embodiment

A scheme capable of ensuring safety of power feed at a high voltage will now be described.

<a4. Configuration of Power Supply Control System 1#>

Figure 19:
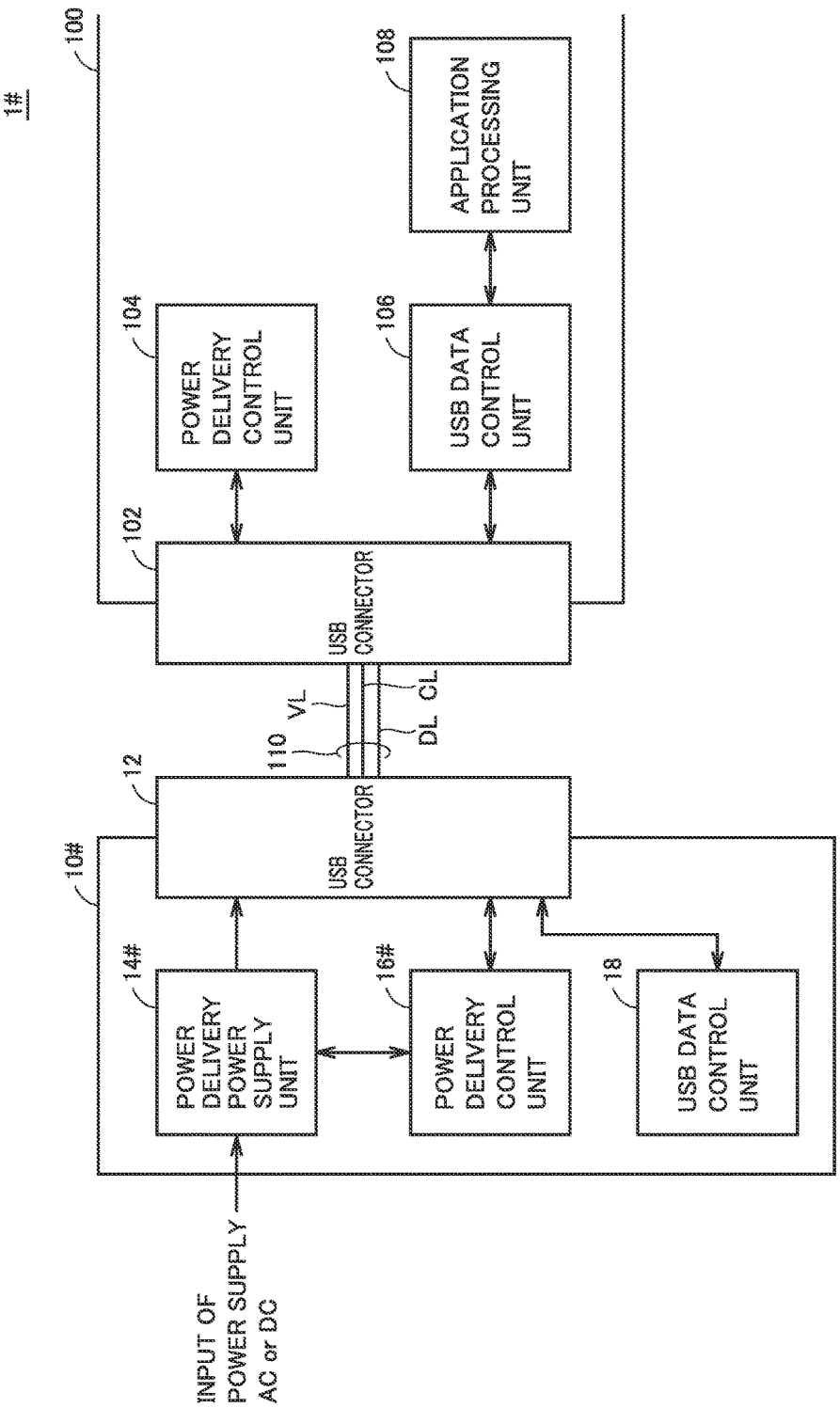
FIG. 19 is a diagram illustrating a configuration of power supply control system 1 based on a second embodiment.

FIG. 19 is a diagram illustrating a configuration of power supply control system 1# based on a second embodiment.

Referring to FIG. 19, a power supply control system 1# includes a power feed device (power feed control device) 10# and power reception device 100.

Replacement of power feed device 10 with power feed device 10# is different from the configuration in FIG. 1. Since the configuration is otherwise similar, detailed description thereof will not be repeated.

Power feed device 10# is different from power feed device 10 in that power delivery power supply unit 14 is replaced with a power delivery power supply unit 14# and power delivery control unit 16 is replaced with a power delivery control unit 16#. Since the configuration is otherwise the same as described with reference to FIG. 1, detailed description thereof will not be repeated.

<a5. Configuration of Power Feed Device 10#>

Figure 20:
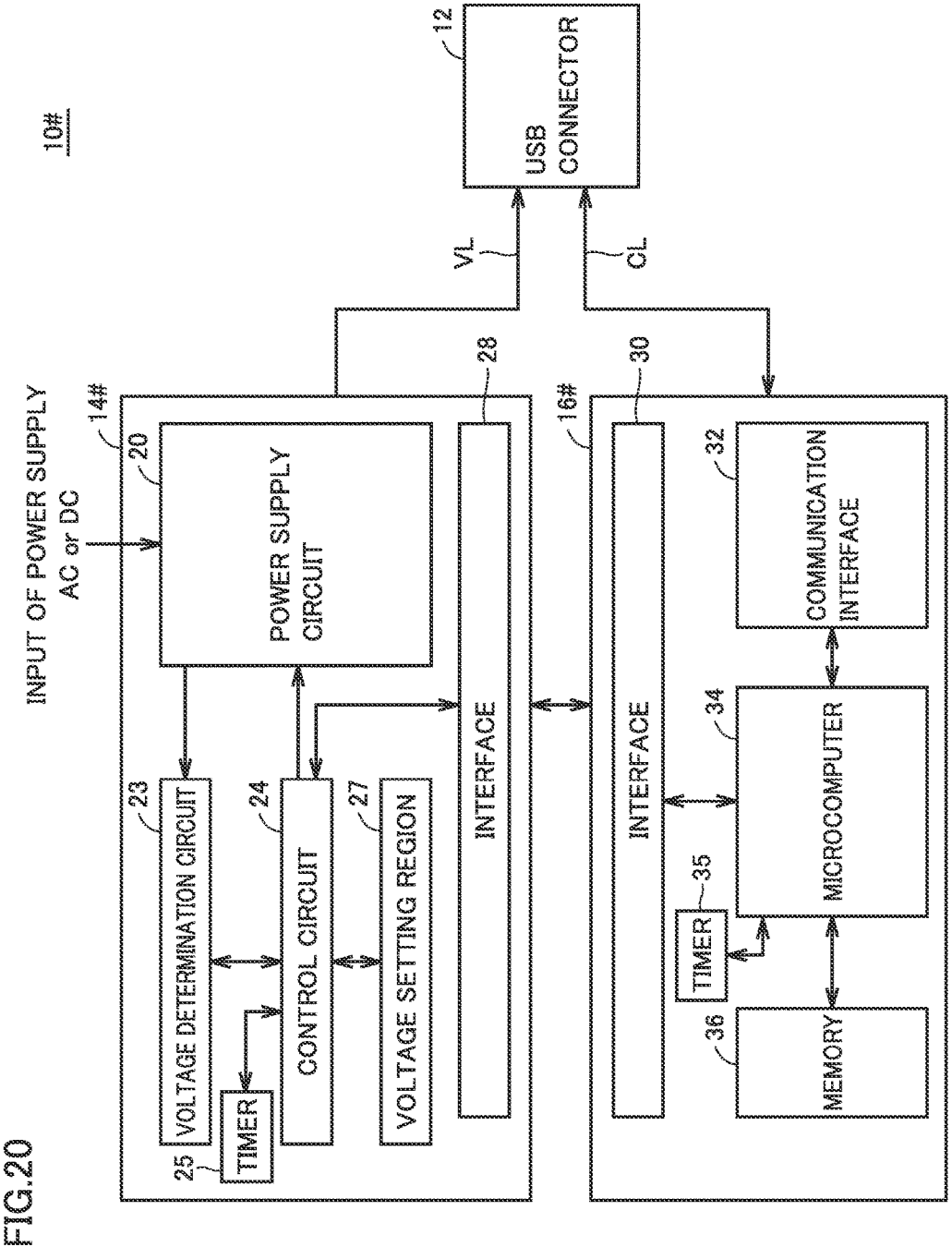
FIG. 20 is a diagram illustrating a configuration of a power feed device 10# based on the second embodiment.

FIG. 20 is a diagram illustrating a configuration of power feed device 10# based on the second embodiment.

Referring to FIG. 20, power feed device 10# includes USB connector 12, power delivery power supply unit 14#, and power delivery control unit 16#. USB data control unit 18 is omitted.

Power delivery power supply unit 14# includes power supply circuit 20, a voltage determination circuit 23, control circuit 24, a timer 25, a register 27, and interface 28.

Power delivery power supply unit 14# is different from power delivery power supply unit 14 in that voltage determination circuit 23 is provided instead of protection circuit 22, register 27 is provided instead of register 26, and timer 25 is further provided. Since the configuration is otherwise similar, detailed description thereof will not be repeated.

Voltage determination circuit 23 determines whether or not a value of a voltage regulated by power supply circuit 20 has attained to a set voltage. Voltage determination circuit 23 outputs a result of determination to control circuit 24. When control circuit 24 determines that a value of the voltage regulated by power supply circuit 20 has attained to the set voltage based on a result of determination by voltage determination circuit 23, it outputs a notification signal to external power delivery control unit 16#.

Control circuit 24 controls entire power delivery power supply unit 14#.

Register 27 stores information on power delivery power supply unit 14#.

Specifically, register 27 stores information on setting of a power supply voltage of power supply circuit 20.

Control circuit 24 writes data in register 27 as necessary.

Timer 25 has a time counting function and counts time in response to an instruction from control circuit 24.

Power delivery control unit 16# includes interface 30, communication interface 32, microcomputer 34, a timer 35, and memory 36.

Power delivery control unit 16# is different from power delivery control unit 16 in further including timer 35. Since the configuration is otherwise the same as in power delivery control unit 16, detailed description thereof will not be repeated.

Timer 35 has a time counting function and counts time in response to an instruction from microcomputer 34.

<a6. Configuration of Voltage Determination Circuit 23>

Figure 21:
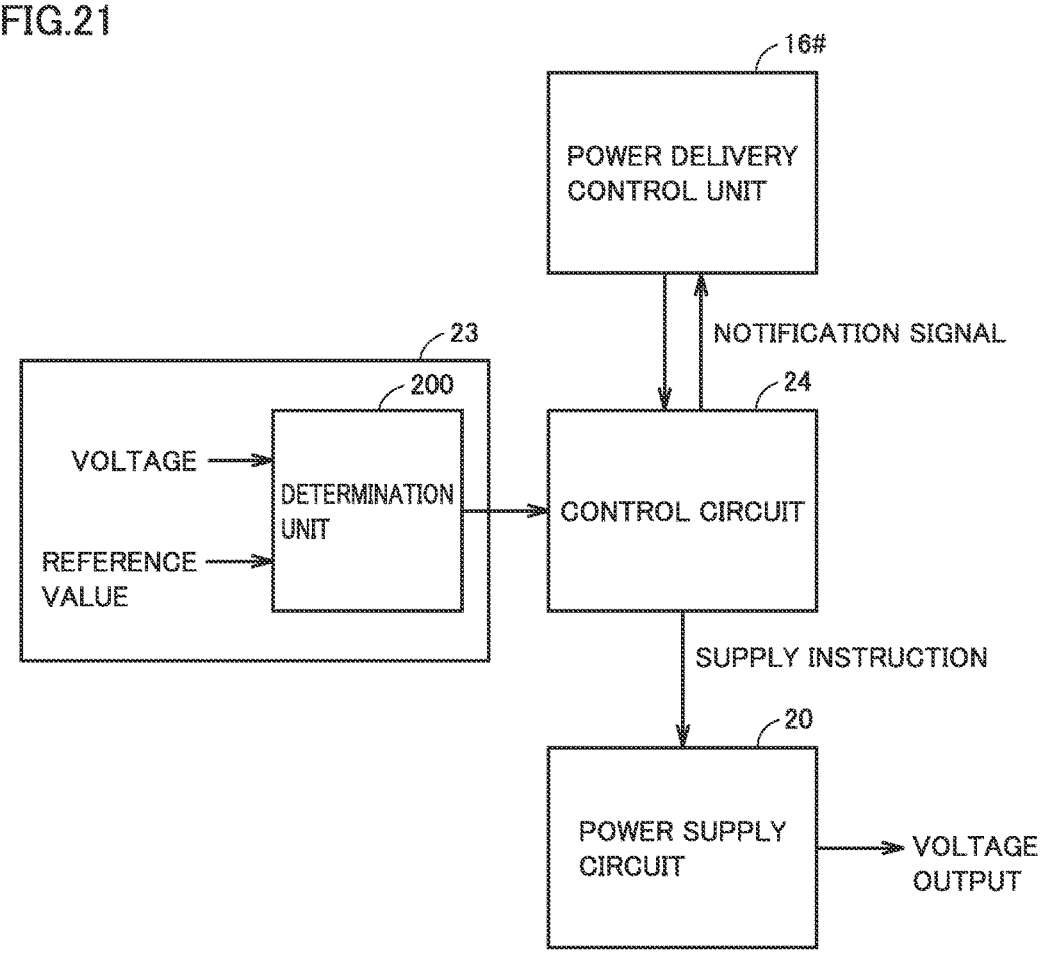
FIG. 21 is a diagram illustrating a configuration of a voltage determination circuit 23 based on the second embodiment.

FIG. 21 is a diagram illustrating a configuration of voltage determination circuit 23 based on the second embodiment.

Referring to FIG. 21, voltage determination circuit 23 includes a determination unit 200.

Specifically, determination unit 200 compares an output voltage regulated by power supply circuit 20 with a reference value, and determines whether or not the output voltage regulated by power supply circuit 20 has attained to (reached) the reference value. The reference value is calculated based on information on setting of the power supply voltage of power supply circuit 20 stored in register 27.

Whether or not the output voltage regulated by power supply circuit 20 has attained to (reached) the reference value includes not only an example where the voltage is the same as the reference value but also an example where the voltage is in the vicinity of the reference value. Specifically, it is determined that the reference value has been reached when a difference between a voltage value and the reference value is within a prescribed range.

Determination unit 200 compares an output voltage regulated by power supply circuit 20 with the reference value, and when it determines that the output voltage regulated by power supply circuit 20 has attained to (reached) the reference value, it outputs that determination to control circuit 24.

Control circuit 24 outputs a notification signal to power delivery control unit 16# based on a result of determination by determination unit 200.

Power delivery control unit 16# notifies power delivery control unit 104 that the voltage is ready. Power reception device 100 starts consumption of a current upon receiving the notification.

<b5. Regulation of Voltage Level>

FIG. 22 is a sequence diagram when a voltage level is regulated from an old voltage to a new voltage in power supply control system 1# based on the second embodiment.

Referring to FIG. 22, power reception device 100 which is the consumption side issues a voltage request (sequence sq1). Power delivery control unit 104 issues a request to power delivery control unit 16# for a voltage necessary for power reception device 100.

Power delivery control unit 16# determines whether or not power can be fed in response to the voltage request from power reception device 100. The power delivery control unit checks whether or not a value of a requested voltage level is within a power feed allowable range. When it is determined that the value of the requested voltage level is within the power feed allowable range, a notification that the voltage is permitted is given to power delivery control unit 104 (sequence sq2).

Power reception device 100 which is the consumption side accepts permission (sequence sq3).

Power reception device 100 is thus set to the stand-by state and waits for an instruction indicating being ready from the power feed side.

Power delivery control unit 104 outputs a notification that permission is accepted to power feed device 10# upon receiving the notification that the voltage is permitted from power feed device 10# which is the supply side.

Upon receiving the notification, power feed device 10# starts an operation to regulate a voltage on the side of power feed device 10# (sequence sq61).

Power delivery control unit 16# transmits voltage information to power delivery power supply unit 14# through interface 30 and interface 28. Control circuit 24 of power delivery power supply unit 14# has register 27 store information on a voltage to be supplied (sequence sq62).

Control circuit 24 of power delivery power supply unit 14# instructs power supply circuit 20 to output a voltage based on information on the voltage set in register 27. Thus, the output voltage is changed from the old voltage to a new voltage (sequence sq63).

Then, when voltage determination circuit 23 determines that the indicated voltage has attained to (reached) the reference value in power supply circuit 20, it outputs that determination to control circuit 24. When control circuit 24 determines that the indicated voltage has attained to (reached) the reference value in power supply circuit 20, it gives a notification signal to power delivery control unit 16# (sequence sq64).

Power delivery control unit 16# determines whether or not a notification signal from power delivery power supply unit 14# has been received after lapse of a prescribed period since transmission of voltage information to power delivery power supply unit 14#, and when the notification signal has been received, it notifies power reception device 100 which is the consumption side that the voltage is ready (sequence sq65). The prescribed period is set in advance to a period equal to or longer than a period necessary until change to a new voltage is made from transmission of voltage information to power delivery power supply unit 14#.

Power reception device 100 which is the consumption side accepts the voltage being ready upon receiving the notification that the voltage is ready from power feed device 10# (sequence sq66).

Thus, power reception device 100 is set from the stand-by state to the current consumption state and driven upon receiving supply of a voltage from power feed device 10#.

In the present scheme, power delivery control unit 16# determines whether or not it has received a notification signal from power delivery power supply unit 14# after lapse of a prescribed period since transmission of voltage information to power delivery power supply unit 14#, and when it has received the notification signal, it notifies power reception device 100 which is the consumption side that a voltage is ready. Therefore, since power is fed after change to a new voltage has been confirmed, safety of power feed by the power feed device can be enhanced.

Figure 23A:
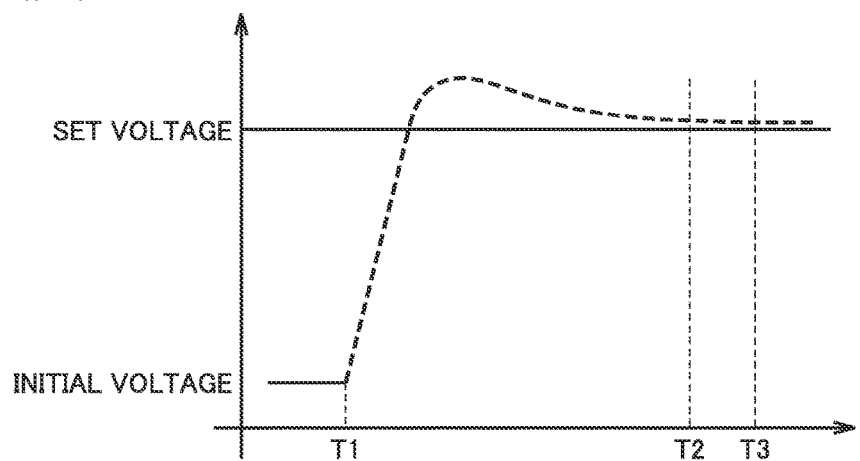
FIGS. 23A and 23B are diagrams illustrating an operation for changing a voltage in a power supply circuit 20 based on the second embodiment.
Figure 23B:
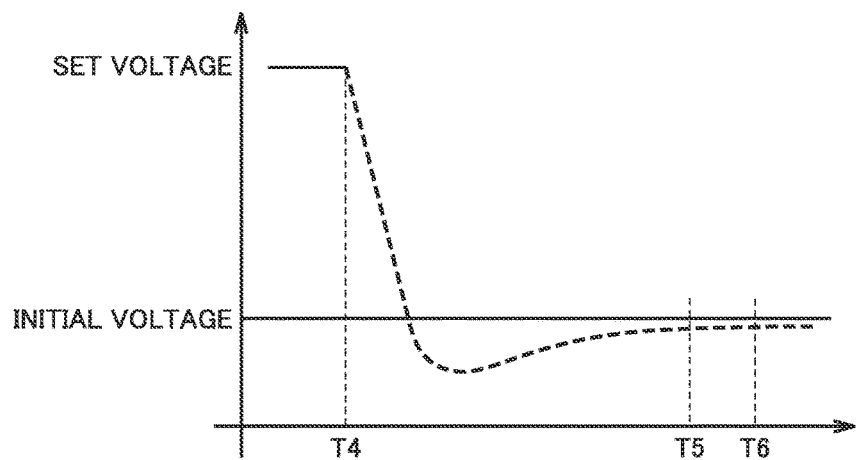

FIGS. 23A and 23B are diagrams illustrating an operation for changing a voltage in power supply circuit 20 based on the second embodiment.

As shown in FIG. 23A, in response to an instruction to change a voltage at time T1, a voltage increases from an initial voltage and is regulated in the vicinity of a set voltage.

At time T2, when a difference between the voltage regulated by power supply circuit 20 and a target set voltage is within a prescribed range, a notification signal is output.

At time T3, timing of lapse of a prescribed period since issuance of the instruction to change a voltage is shown. Power delivery control unit 16# determines whether or not it has received a notification signal from power delivery power supply unit 14# after lapse of a prescribed period since transmission of voltage information to power delivery power supply unit 14#, and when it has received the notification signal, it notifies power reception device 100 which is the consumption side that a voltage is ready.

As shown in FIG. 23B, in accordance with an instruction to change a voltage at time T4, a voltage lowers from an initial voltage and is regulated in the vicinity of a set voltage.

At time T5, when a difference between the voltage regulated by power supply circuit 20 and the target set voltage is within a prescribed range, a notification signal is output.

At time T6, timing of lapse of a prescribed period since issuance of the instruction to change a voltage is shown. Power delivery control unit 16# determines whether or not it has received a notification signal from power delivery power supply unit 14# after lapse of a prescribed period since transmission of voltage information to power delivery power supply unit 14#, and when it has received the notification signal, it notifies power reception device 100 which is the consumption side that a voltage is ready.

<b6. In Case of Abnormal Condition in Regulation of Voltage Level>

FIG. 24 is a sequence diagram illustrating an operation in an abnormal condition in regulation of a voltage level in power supply control system 1# based on the second embodiment.

Referring to FIG. 24, sequences sq1 to sq3 and sq61 to sq63 are the same as the operations described with reference to FIG. 22.

Control circuit 24 of power delivery power supply unit 14# instructs power supply circuit 20 to output a voltage based on information on a voltage set in register 27. Thus, in sequence sq63, an output voltage is changed from the old voltage to a new voltage.

In the present example, occurrence of an abnormal condition in power supply circuit 20 will be described.

Voltage determination circuit 23 does not output to control circuit 24 an indication that an indicated voltage has attained to (reached) the reference value in power supply circuit 20. Therefore, control circuit 24 does not give a notification signal to power delivery control unit 16#.

Power delivery control unit 16# determines whether or not a notification signal has been received from power delivery power supply unit 14# after lapse of a prescribed period since transmission of voltage information to power delivery power supply unit 14#. When power delivery control unit 16# determines that it has not received a notification signal after lapse of a prescribed period from power delivery power supply unit 14#, it gives a hard reset notification to power delivery control unit 104 (sequence sq70).

Power reception device 100 which is the consumption side accepts the hard reset notification (sequence sq71). Thus, power reception device 100 is set to the stand-by state in which supply of a voltage from power feed device 10# is awaited.

Then, power feed device 10# which is the power feed side gives a reset instruction (sequence sq72). Power delivery control unit 16# instructs power delivery power supply unit 14# to reset.

Power delivery power supply unit 14# changes a voltage upon receiving the reset instruction from power delivery control unit 16# (sequence sq73). Control circuit 24 of power delivery power supply unit 14# sets a voltage from power supply circuit 20 to 0 V upon receiving the reset instruction.

In the present scheme, power delivery control unit 16# determines whether or not it has received a notification signal from power delivery power supply unit 14# after lapse of a prescribed period since transmission of voltage information to power delivery power supply unit 14#, and when it has not received the notification signal, it gives a reset instruction so as to cut off supply of a voltage. Therefore, when a voltage is abnormal, safety of power feed by the power feed device can be enhanced by cutting off a voltage.

<c11. Regulation of Voltage Level>

FIG. 25 is a flowchart when processing for regulating a voltage level in power delivery control unit 16# based on the second embodiment is performed.

Referring to FIG. 25, power delivery control unit 16# determines whether or not a voltage request from power reception device 100 which is the consumption side has been issued (step S2).

When there is no voltage request from power reception device 100 which is the consumption side in step S2 (NO in step S2), power delivery control unit 16# does not have to regulate a voltage level and maintains a state in step S2.

When a voltage request from power reception device 100 which is the consumption side has been issued in step S2 (YES in step S2), power delivery control unit 16# checks a voltage request in power feed (step S4).

Then, power delivery control unit 16# determines whether or not the voltage request is OK (step S6). Specifically, power delivery control unit 16# determines whether or not power can be fed in response to the voltage request from power reception device 100. Whether or not a value of a requested voltage level is within a power feed allowable range is checked.

When power delivery control unit 16# determines that the voltage request is OK (YES in step S6), it gives a notification that a voltage is permitted (step S8). Power delivery control unit 16# notifies power delivery control unit 104 of power reception device 100 which is the consumption side that a voltage is permitted. Power reception device 100 is thus set to the stand-by state and waits for an instruction indicating being ready from the power feed side.

Then, power delivery control unit 16# determines whether or not it has received a notification that permission is accepted (step S9).

Power delivery control unit 16# maintains step S9 until it receives a notification that permission is accepted, and when it determines that it has received the notification (YES in step S9), it transmits voltage information to power delivery power supply unit 14# (step S10#). Power delivery power supply unit 14# changes a voltage upon receiving transmission of the voltage information (an instruction to change).

Then, power delivery control unit 16# determines whether or not a prescribed period has elapsed (step S12). The prescribed period is set in advance to a period equal to or longer than a period necessary until change to a new voltage is made from transmission of voltage information to power delivery power supply unit 14#.

When power delivery control unit 16# determines that a prescribed period has elapsed (YES in step S12), it determines whether or not a notification signal has been issued from power delivery power supply unit 14# (step S13).

When power delivery control unit 16# determines in step S13 that the notification signal has been issued from power delivery power supply unit 14# (YES in step S13), it notifies power reception device 100 which is the consumption side that a voltage is ready (step S14). Then, the process ends (end).

Power reception device 100 thus accepts the indication that the voltage is ready, makes transition from the stand-by state to the current consumption state, and is driven upon receiving supply of a voltage from power feed device 10#.

When power delivery control unit 16# determines in step S6 that a voltage request is not OK (NO in step S6), it gives a notification that a voltage is not permitted (not permitted) (step S16).

Then, the process ends (end). In this case, requested power supply to power reception device 100 is not started.

When power delivery control unit 16# determines in step S13 that no notification signal has been issued from power delivery power supply unit 14# (NO in step S13), it gives a hard reset notification to power reception device 100 which is the consumption side (step S17).

Then, power delivery control unit 16# gives a reset instruction to power delivery power supply unit 14# (step S18). Power delivery power supply unit 14# sets a voltage to 0 V upon receiving the reset instruction. Then, the process ends (end).

<c12. Operation for Regulating Voltage by Power Delivery Power Supply Unit 14#>

Figure 26:
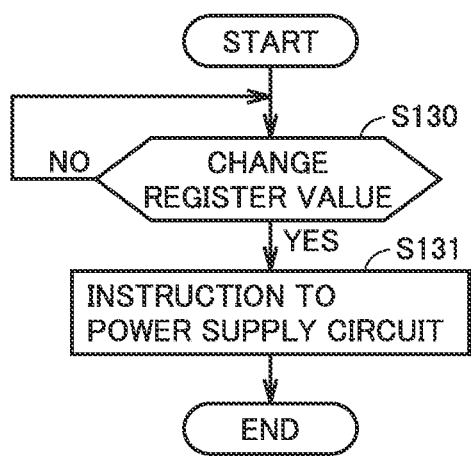
FIG. 26 is a flowchart illustrating an operation for regulating a voltage of a power delivery power supply unit 14# based on the second embodiment.

FIG. 26 is a flowchart illustrating an operation for regulating a voltage of power delivery power supply unit 14# based on the second embodiment. An operation of control circuit 24 of power delivery power supply unit 14# will be described.

Referring to FIG. 26, control circuit 24 determines whether or not a value in the register storing an output voltage has been changed in response to a voltage instruction from power delivery control unit 16# (step S130).

When a value in the register storing an output voltage has been changed in step S130 in response to the voltage instruction from power delivery control unit 16# (YES in step S130), control circuit 24 instructs power supply circuit 20 to output a voltage value stored in register 27 (step S131).

Then, the process ends (end).

<b7. Operation for Determining Abnormal Condition During Power Feed>

Figure 27:
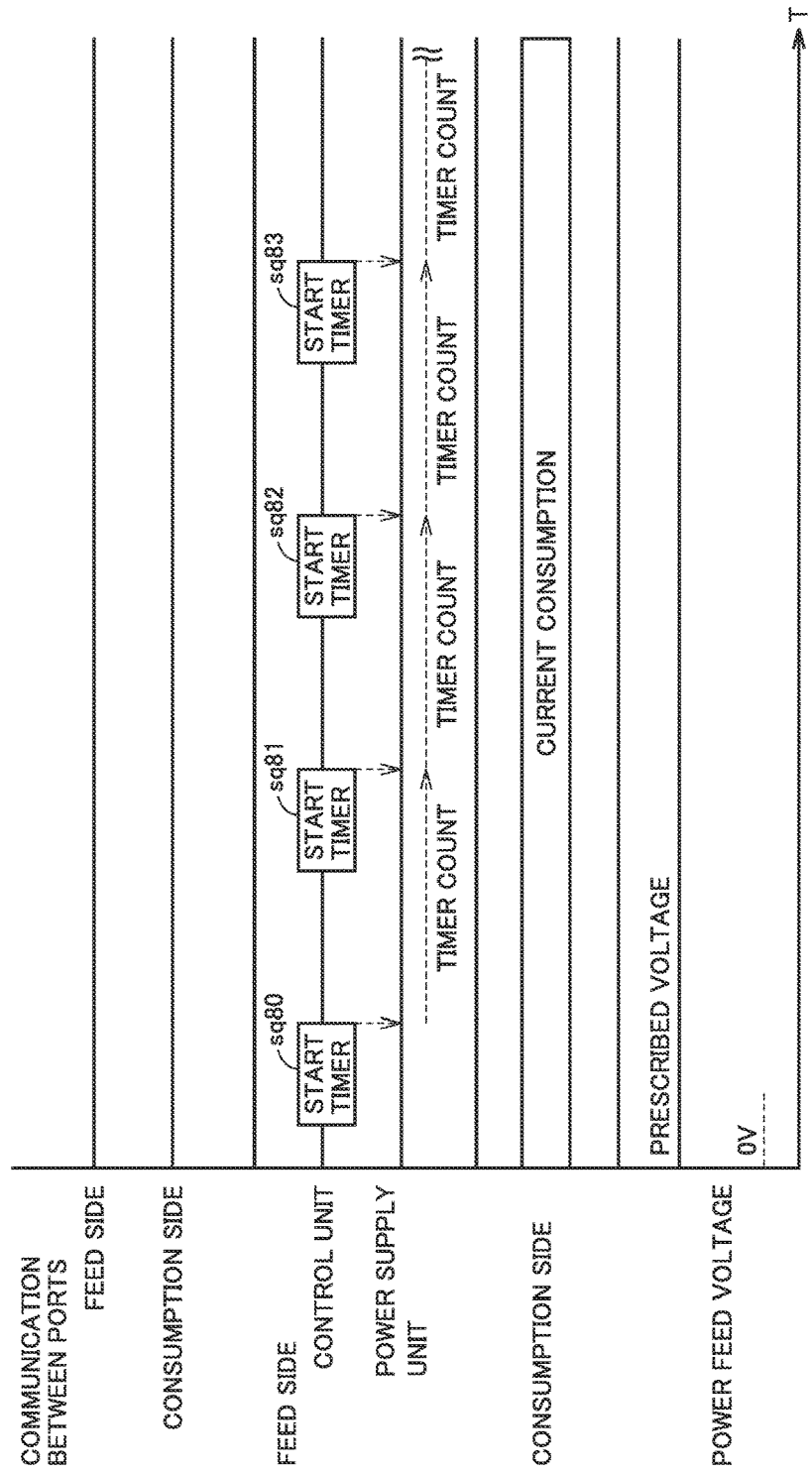
FIG. 27 is a sequence diagram illustrating a normal operation during power feed from power delivery power supply unit 14# to a power reception device 100 based on the second embodiment.

FIG. 27 is a sequence diagram illustrating a normal operation during power feed from power delivery power supply unit 14# to power reception device 100 based on the second embodiment.

Referring to FIG. 27, power delivery control unit 16# which is the power feed side outputs a timer reset command for resetting timer 25 to power delivery power supply unit 14# every prescribed period (sequences sq80, sq81, sq82, and sq83).

Power delivery power supply unit 14# initializes a timer value and starts counting upon receiving the timer reset command from power delivery control unit 16#. This processing is repeated each time of the timer reset command.

Figure 28:
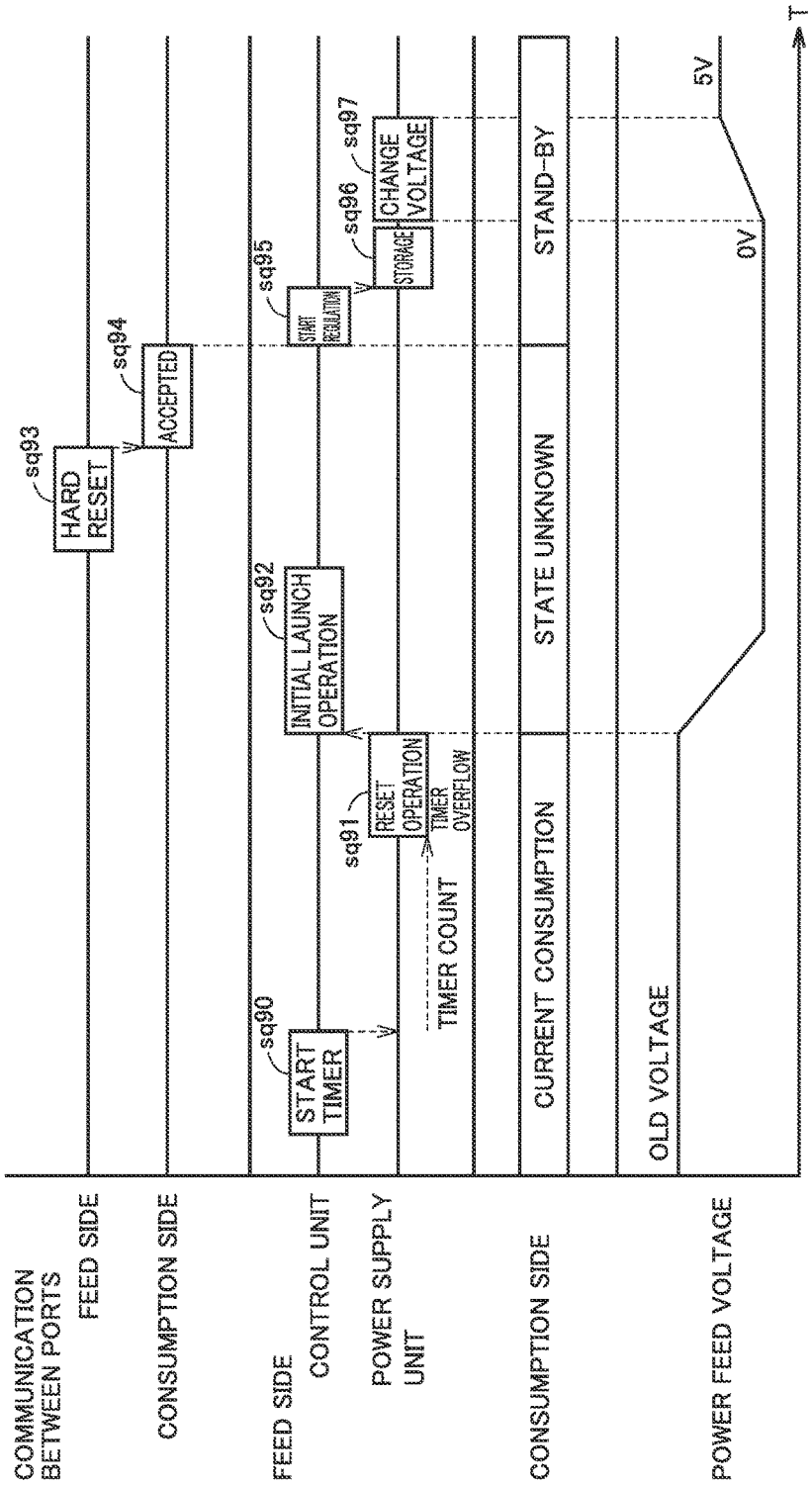
FIG. 28 is a sequence diagram illustrating an operation when an abnormal condition occurs during power feed from power delivery power supply unit 14# to power reception device 100 based on the second embodiment.

FIG. 28 is a sequence diagram illustrating an operation when an abnormal condition occurs during power feed from power delivery power supply unit 14# to power reception device 100 based on the second embodiment.

Referring to FIG. 28, power delivery control unit 16# which is the power feed side outputs a timer reset command for resetting timer 25 to power delivery power supply unit 14# every prescribed period (sequence sq90).

Power delivery power supply unit 14# initializes a timer value and starts counting upon receiving the timer reset command from power delivery control unit 16#.

In the present example, a timer value of timer 25 has exceeded a prescribed value (timer overflow).

When power delivery power supply unit 14# determines that the timer value has exceeded the prescribed value, it instructs power delivery control unit 16# to perform a reset operation (sequence sq91).

Power delivery control unit 16# performs a prescribed initial launch operation in accordance with an instruction for a reset operation from power delivery power supply unit 14# (sequence sq92). The initial launch operation is an operation for resetting entire power delivery control unit 16# based on a prescribed reset program stored in memory 36.

Power delivery control unit 16# gives a hard reset notification to power feed device 10# which is the power feed side together with the initial launch operation (sequence sq93). Power delivery control unit 16# gives a hard reset notification to power delivery control unit 104.

Power reception device 100 which is the consumption side accepts the hard reset notification (sequence sq94). Thus, power reception device 100 is set to the stand-by state in which supply of a voltage from power feed device 10# is awaited.

In response, power feed device 10# starts a voltage regulation operation on its side (sequence sq95).

Power delivery control unit 16# transmits voltage information to power delivery power supply unit 14# through interface 30 and interface 28. Control circuit 24 of power delivery power supply unit 14# has register 27 store information on a voltage to be supplied (sequence sq96). Specifically, control circuit 24 sets an initial value as information on a voltage to be supplied in register 27. In the present example, 5 V is set.

Control circuit 24 of power delivery power supply unit 14# instructs power supply circuit 20 to output a voltage based on information on a voltage set in register 27. Thus, the output voltage is changed from the old voltage to a new voltage (sequence sq97).

In the present scheme, power delivery power supply unit 14# instructs power delivery control unit 16# to perform a reset operation when a prescribed condition is satisfied. Specifically, when there is no input of a timer reset command periodically input from power delivery control unit 16#, power delivery power supply unit 14# determines that there is some kind of abnormal condition in power delivery control unit 16# and gives an instruction to perform a reset operation indicating execution of an initial launch operation. Thus, power delivery power supply unit 14# can also monitor a state of power delivery control unit 16#. Power delivery control unit 16# can determine a state of power delivery power supply unit 14# in accordance with a notification signal from voltage determination circuit 23. Therefore, power delivery control unit 16# and power delivery power supply unit 14# monitor states of each other, and if there is an abnormal condition, they can perform a reset operation. Therefore, safety of power feed by the power feed device can be enhanced.

<c13. Operation for Timer Reset Command by Power Delivery Control Unit 16#>

Figure 29:
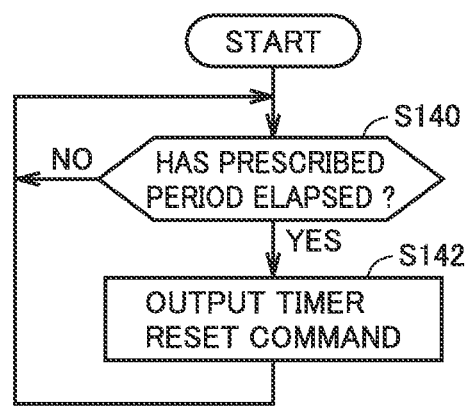
FIG. 29 is a flowchart illustrating an operation of power delivery control unit 16# based on the second embodiment in issuance of a timer reset command.

FIG. 29 is a flowchart illustrating an operation of power delivery control unit 16# based on the second embodiment in issuance of a timer reset command. An operation of microcomputer 34 of power delivery control unit 16# will be described.

Referring to FIG. 29, microcomputer 34 determines whether or not a prescribed period has elapsed (step S140). Microcomputer 34 may determine whether or not a prescribed period has elapsed with the use of timer 35.

When microcomputer 34 determines in step S140 that a prescribed period has elapsed (YES in step S140), it outputs a timer reset command (step S142).

Then, the process returns to step S140 and the process is repeated.

<c14. Operation for Timer Reset Command by Power Delivery Power Supply Unit 14#>

Figure 30:
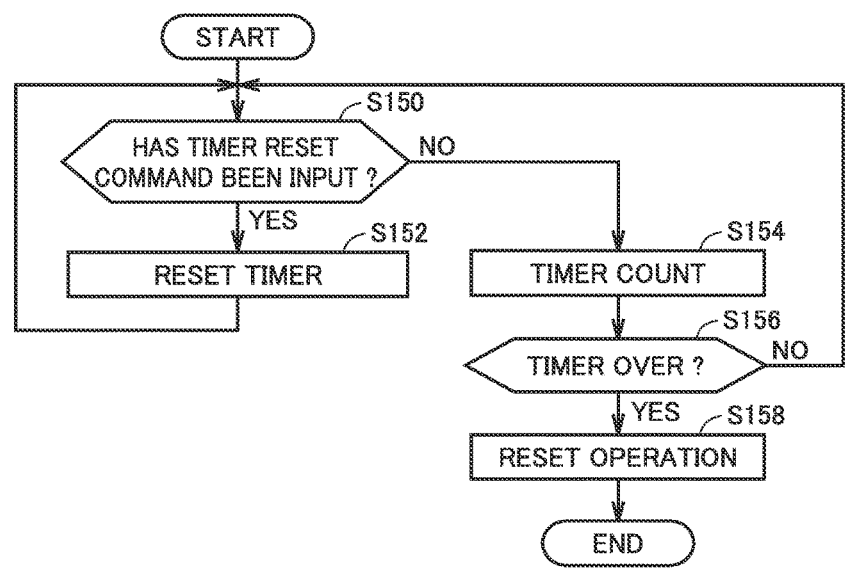
FIG. 30 is a flowchart illustrating an operation of power delivery power supply unit 14# based on the second embodiment in issuance of the timer reset command.

FIG. 30 is a flowchart illustrating an operation of power delivery power supply unit 14# based on the second embodiment in issuance of a timer reset command. An operation of control circuit 24 of power delivery power supply unit 14# will be described.

Referring to FIG. 30, control circuit 24 determines whether or not a timer reset command has been input (step S150).

When control circuit 24 determines in step S150 that the timer reset command has been input (YES in step S150), it resets timer 25 (step S152).

Then, the process returns to step S150.

When control circuit 24 determines in step S150 that there is no input of the timer reset command (NO in step S150), control circuit 24 instructs to timer for counting (step S154).

Then, whether or not a timer value of timer 25 has exceeded a prescribed value (timer over) is determined (step S156).

When it is determined in step S156 that a timer value of timer 25 has exceeded the prescribed value (YES in step S156), a reset operation instruction is given (step S158).

Then, the process ends (end).

When it is determined in step S156 that a timer value of timer 25 has not exceeded the prescribed value (NO in step S156), the process returns to step S150 and the process is repeated.

Third Embodiment

Figure 31:
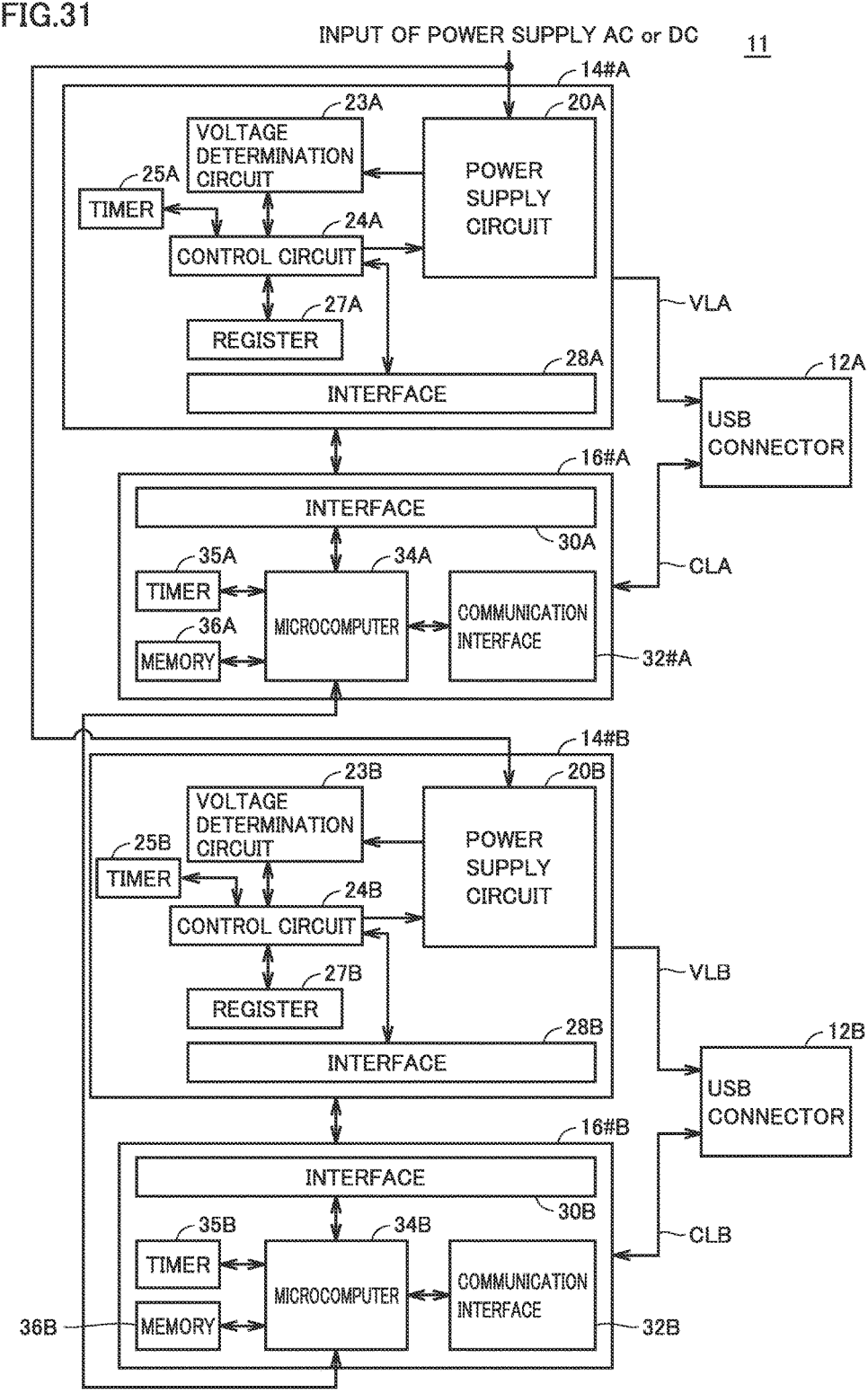
FIG. 31 is a diagram illustrating a configuration of a power feed device 11 based on a third embodiment.

FIG. 31 is a diagram illustrating a configuration of a power feed device 11 based on a third embodiment.

Referring to FIG. 31, power feed device 11 has a plurality of USB connectors 12A and 12B. The USB data control unit is not shown.

A power delivery power supply unit 14#A and a power delivery control unit 16#A are included in correspondence with USB connector 12A.

A power delivery power supply unit 14#B and a power delivery control unit 16#B are included in correspondence with USB connector 12B.

Since power delivery power supply units 14#A and 14#B are basically similar in configuration to power delivery power supply unit 14# in FIG. 20, detailed description thereof will not be repeated. "A" and "B" are affixed to a reference numeral for each constituent element of power delivery power supply unit 14# in FIG. 20.

Since power delivery control units 16#A and 16#B are basically similar in configuration to power delivery control unit 16# in FIG. 20, detailed description thereof will not be repeated. "A" and "B" are affixed to a reference numeral for each constituent element of power delivery control unit 16# in FIG. 20.

A microcomputer 34A and a microcomputer 34B supply and receive data to and from each other.

<c15. Regulation of Voltage Level>

Figure 32:
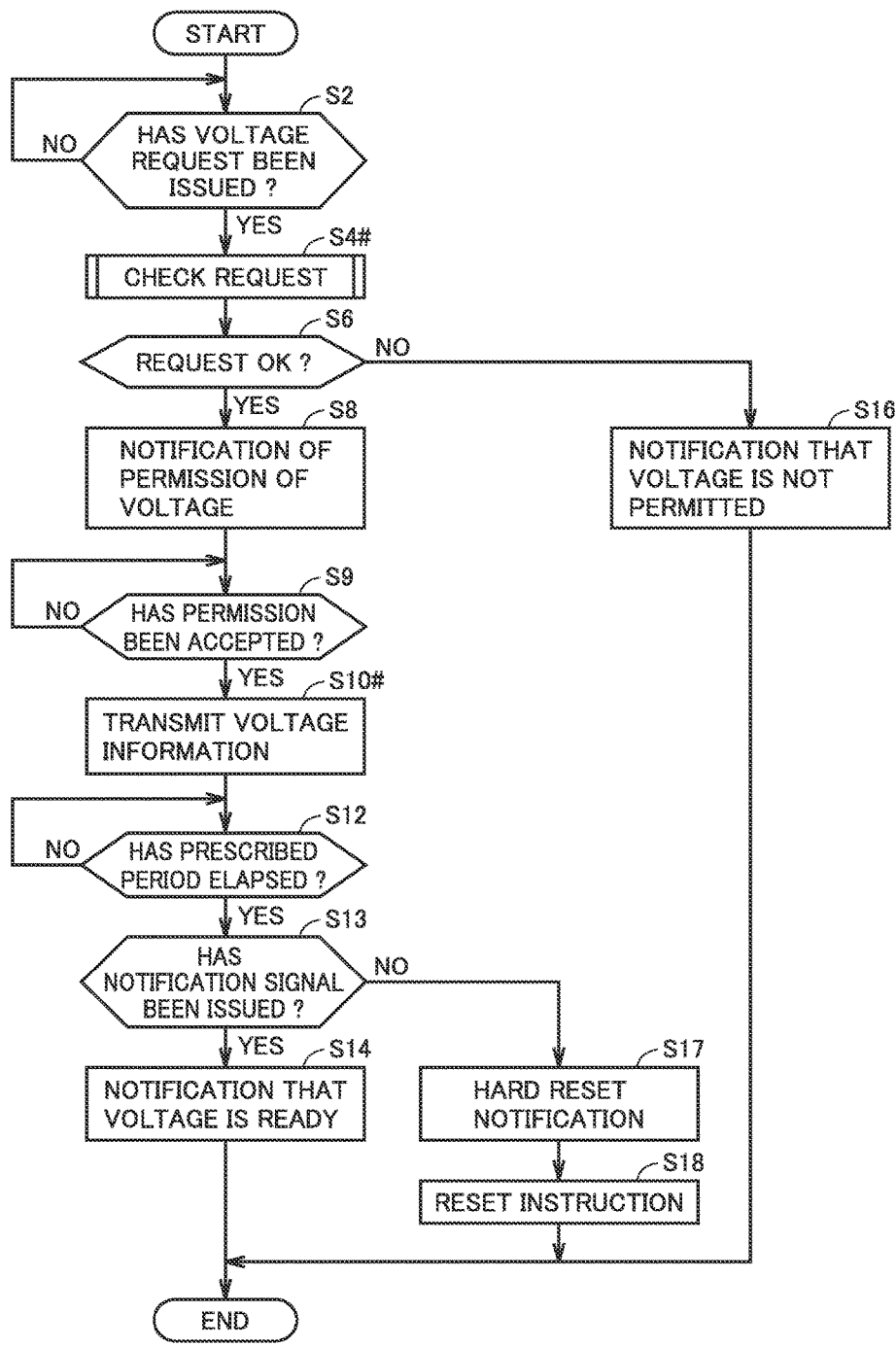
FIG. 32 is a flowchart when processing for regulating a voltage level in each of power delivery control units 16#A and 16#B based on the third embodiment is performed.

FIG. 32 is a flowchart when processing for regulating a voltage level in each of power delivery control units 16#A and 16#B based on the third embodiment is performed.

Referring to FIG. 32, replacement of step S4 in which a voltage request in power feed is checked with step S4# is different from the flowchart in FIG. 25. Since other portions are the same as described with reference to FIG. 25, detailed description thereof will not be repeated.

Figure 33:
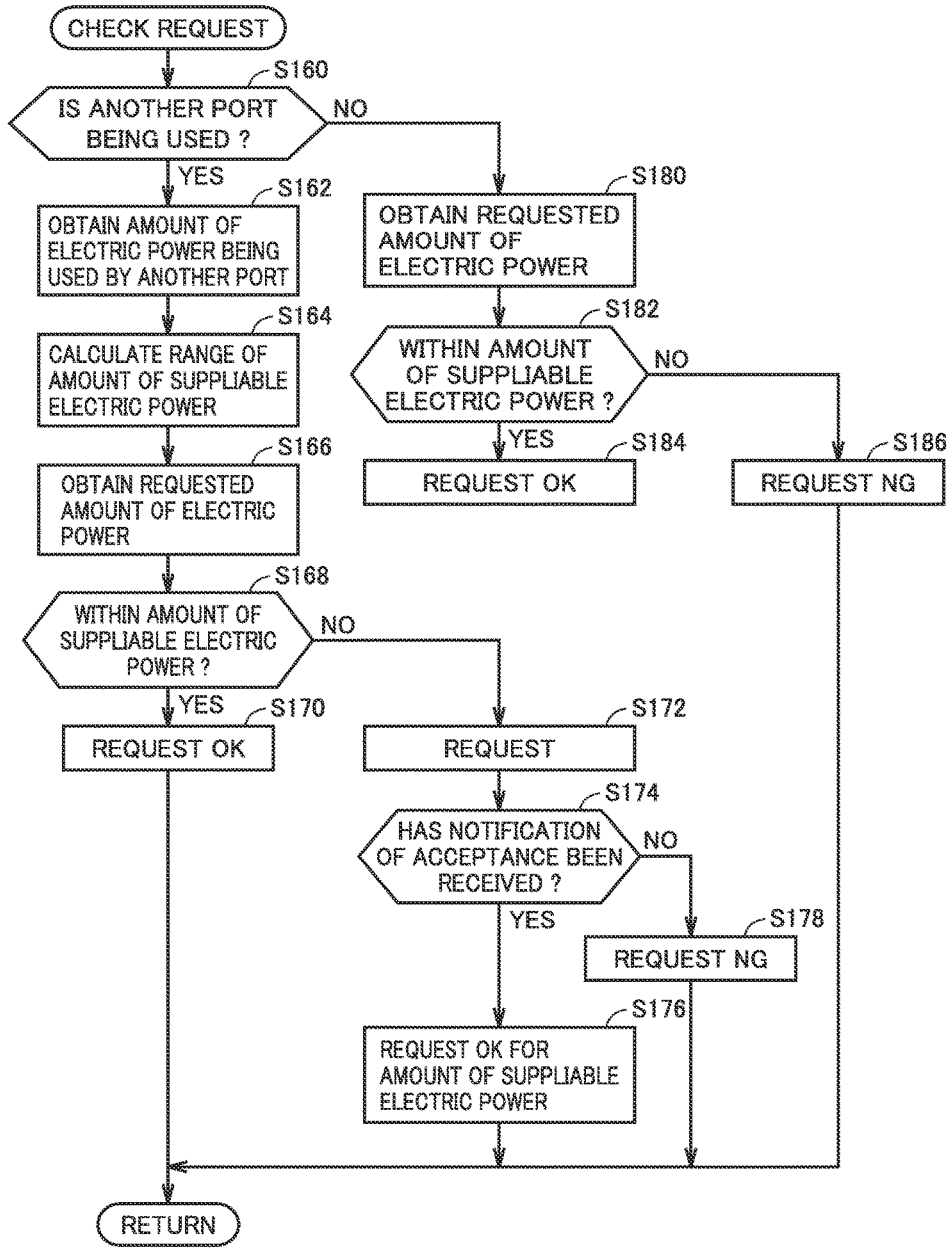
FIG. 33 is a flowchart illustrating a sub routine process for checking a voltage request in power feed in step S4#.

FIG. 33 is a flowchart illustrating a sub routine process for checking a voltage request in power feed in step S4#.

As shown in FIG. 33, power delivery control units 16#A and 16#B determine whether or not another port is being used (step S160). For example, power delivery control unit 16#B determines whether or not a USB device is connected to USB connector 12A which is another port different from USB connector 12B which is a corresponding port. Microcomputer 34B accesses microcomputer 34A and checks whether or not a USB device is connected to USB connector 12A.

When power delivery control units 16#A and 16#B determine in step S160 that another port is being used (YES in step S160), they obtain an amount of electric power used by another port (step S162). For example, microcomputer 34B of power delivery control unit 16#B accesses microcomputer 34A, and when it determines that a USB device is connected to USB connector 12A, it obtains information on an amount of electric power used by that USB device.

Then, power delivery control units 16#A and 16#B calculate an amount of suppliable electric power (step S164). Power delivery control unit 16#B calculates an amount of suppliable electric power by subtracting an amount of electric power used from a maximum amount of suppliable electric power of power supply input AC or DC power supply input.

Then, power delivery control units 16#A and 16#B obtain a requested amount of electric power (step S166). Power delivery control units 16#A and 16#B obtain requested amounts of electric power based on voltage requests from USB devices connected to corresponding USB connectors 12A and 12B, respectively.

Power delivery control units 16#A and 16#B determine whether or not the obtained requested amounts of electric power of the USB devices are within a range of an amount of suppliable electric power (step S168).

When power delivery control units 16#A and 16#B determine in step S168 that the requested amounts of electric power are within the range of the amount of suppliable electric power (YES in step S168), they make a determination as request OK (step S170).

Then, the process ends (return). The process proceeds to step S6.

When power delivery control units 16#A and 16#B determine in step S168 that the requested amounts of electric power are not within the range of the amount of suppliable electric power (NO in step S168), they give a request (step S172). Specifically, power delivery control units 16#A and 16#B transmit to power reception device 100, information that only electric power in the amount of suppliable electric power can be fed. Power reception device 100 determines whether or not to request power feed in that amount of electric power based on information that electric power only in the amount of suppliable electric power can be fed. Since power consumption can be reduced in drive of power reception device 100 in a power save mode, whether or not power can be fed by changing a mode is determined. If electric power can be fed, power reception device 100 outputs a notification of acceptance to power feed device 10#.

Then, power delivery control units 16#A and 16#B determine whether or not a notification of acceptance has been given from power reception device 100 (step S174). Microcomputers 34A and 34B of respective power delivery control units 16#A and 16#B determine whether or not they have received a notification of acceptance from power reception device 100.

When power delivery control units 16#A and 16#B determine in step S174 that they have received the notification of acceptance (YES in step S174), they make a determination as request OK for an amount of suppliable electric power (step S176). Microcomputers 34A and 34B of respective power delivery control units 16#A and 16#B make a determination as request OK for an amount of suppliable electric power. Then, the process ends (return). The process proceeds to step S6.

When power delivery control units 16#A and 16#B determine in step S174 that they have not received a notification of acceptance (NO in step S174), they make a determination as request NG (step S178). In this case, electric power is not fed to power reception device 100.

Then, the process ends (return). The process proceeds to step S6.

When power delivery control units 16#A and 16#B determine in step S160 that another port is not being used (NO in step S160), they obtain a requested amount of electric power (step S180). Power delivery control units 16#A and 16#B obtain requested amounts of electric power based on voltage requests from USB devices connected to corresponding USB connectors 12A and 12B, respectively.

Power delivery control units 16#A and 16#B determine whether or not the requested amounts of electric power are within the range of the amount of suppliable electric power (step S182).

When power delivery control units 16#A and 16#B make a determination in step S182 that the requested amounts of electric power are within the range of the amount of suppliable electric power (YES in step S182), they make a determination as request OK (step S184).

Then, the process ends (return). The process proceeds to step S6.

When power delivery control units 16#A and 16#B make a determination in step S182 that the requested amounts of electric power are not within the range of the amount of suppliable electric power (NO in step S182), they make a determination as request NG (step S186). Then, the process ends (return). The process proceeds to step S6.

In the present scheme, with a plurality of USB connectors 12A and 12B being provided, for example, when a USB device is attached to USB connector 12A and thereafter a USB device is attached to USB connector 12B, whether or not electric power can be fed to the USB device connected to USB connector 12B is determined. Whether or not the requested amounts of electric power are within a range of an amount of suppliable electric power is determined, and when the requested amounts of electric power are not within the range of the suppliable electric power, an inquiry request as to whether or not feed with suppliable electric power to the USB device can be done is issued.

When the USB device outputs a notification of acceptance in response to the inquiry request, electric power in the amount of suppliable electric power is fed. Accordingly, a voltage is supplied from power delivery power supply unit 14# based on the amount of suppliable electric power.

Thus, even when a total amount of electric power requested by the plurality of USB devices exceeds the maximum amount of suppliable electric power, whether or not electric power in an amount of suppliable electric power can be fed is checked by issuing a request. If electric power can be fed, electric power in an amount of suppliable electric power is fed. Thus, electric power can be fed from the power feed device to the plurality of USB devices with safety of power feed at a high voltage being ensured.

Fourth Embodiment

In the third embodiment, the process is performed by supplying and receiving data between power delivery control unit 16#A and power delivery control unit 164B. Without being limited to such a configuration, for example, power delivery control unit 16#A and power delivery control unit 16#B may both be managed.

Figure 34:
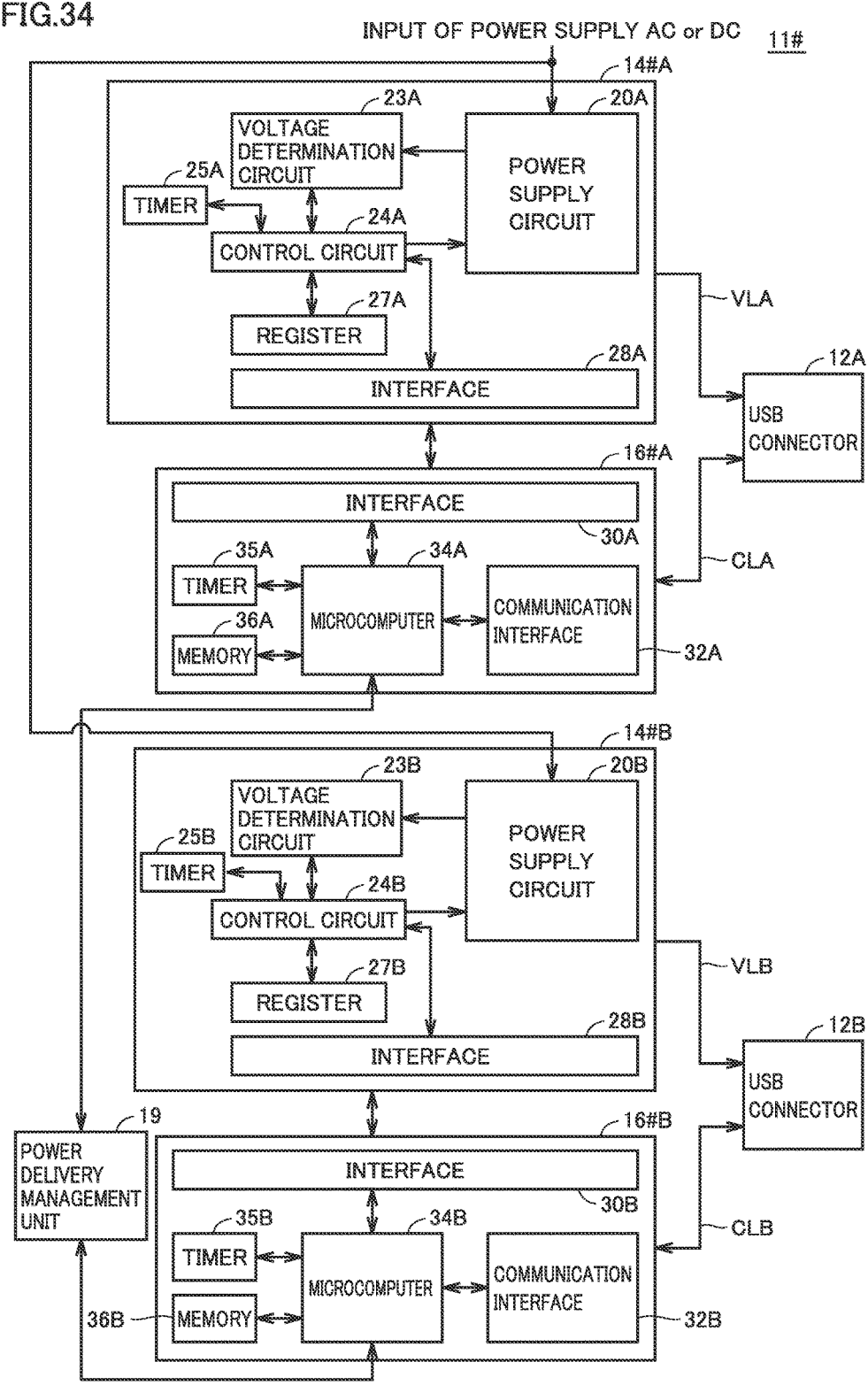
FIG. 34 is a diagram illustrating a configuration of a power feed device 11# based on a fourth embodiment.

FIG. 34 is a diagram illustrating a configuration of a power feed device 11# based on a fourth embodiment.

Referring to FIG. 34, power feed device 11# includes a plurality of USB connectors 12A and 12B.

Power delivery power supply unit 14#A and power delivery control unit 16#A are included in correspondence with USB connector 12A.

Power delivery power supply unit 14#B and power delivery control unit 16#B are included in correspondence with USB connector 12B.

In the present example, a power delivery management unit 19 managing power delivery control units 16#A and 16#B is further provided.

Since each of power delivery power supply units 14#A and 14#B is basically similar in configuration to power delivery power supply unit 14# in FIG. 20, detailed description thereof will not be repeated. "A" and "B" are affixed to a reference numeral for each constituent element of power delivery power supply unit 14# in FIG. 20.

Since each of power delivery control units 16#A and 16#B is basically similar in configuration to power delivery control unit 16# in FIG. 20, detailed description thereof will not be repeated. "A" and "B" are affixed to a reference numeral for each constituent element of power delivery control unit 16# in FIG. 20.

Microcomputer 34A and microcomputer 34B supply and receive data to and from power delivery management unit 19.

Power delivery management unit 19 may perform a part of processing in regulation of a voltage level described above.

Specifically, power delivery management unit 19 may perform processing for checking a voltage request in power feed described with reference to FIG. 33.

When there is a voltage request from power reception device 100 which is the consumption side, power delivery control units 16#A and 16#B output an indication to that effect to power delivery management unit 19.

Then, power delivery management unit 19 checks a voltage request in power feed.

Since the processing for checking a voltage request in power feed in power delivery management unit 19 is the same as in the flowchart described with reference to FIG. 15, detailed description thereof will not be repeated.

Then, power delivery management unit 19 checks the voltage request in power feed. When power can be fed, the power delivery management unit makes a determination as request OK and provides the determination to power delivery control units 16#A and 16#B.

Since processing thereafter is the same as described with reference to FIG. 32, detailed description thereof will not be repeated.

<Other Forms>

Though supply of a power supply voltage is received from power feed device 10# in power reception device 100, power reception device 100 can also include power delivery power supply unit 14# and power delivery control unit 16# similarly to power feed device 10#. Power reception device 100 can also have a function as power feed device 10# and supply a power supply voltage to yet another USB device.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A semiconductor device comprising:
a power supply circuit which generates an output voltage to be supplied to a USB device connected to a USB connector;
a sensing circuit which senses the output voltage or an output state of the power supply circuit;
a control circuit which controls the power supply circuit; and
a register which stores an output set voltage value associated with the power supply circuit or various types of information,
the control circuit outputting a notification signal based on a result of sensing by the sensing circuit to outside.

2. The semiconductor device according to claim 1, wherein
the control circuit has the register store the output set voltage value associated with the power supply circuit or information on a state of the power supply circuit based on the result of sensing by the sensing circuit.

3. The semiconductor device according to claim 2, wherein
the control circuit has the register store the output set voltage value based on a setting command from the outside.

4. The semiconductor device according to claim 2, wherein
the sensing circuit includes a temperature abnormal condition determination circuit which determines whether a temperature of the power supply circuit is normal, and
the control circuit has the register store information on the output state of the power supply circuit based on a result of determination by the temperature abnormal condition determination circuit.

5. The semiconductor device according to claim 2, wherein
the sensing circuit includes a voltage abnormal condition determination circuit which determines whether a voltage of the power supply circuit is normal, and
the control circuit has the register store information on the state of the power supply circuit based on a result of determination by the voltage abnormal condition determination circuit.

6. A semiconductor device comprising:
a power supply unit which generates an output voltage to be supplied to a USB device connected to a USB connector; and
a control unit which controls the power supply unit,
the power supply unit including
a power supply circuit,
a sensing circuit which senses an output voltage or an output state of the power supply circuit,
a power supply control circuit which controls the power supply circuit, and
a register which stores an output set voltage value associated with the power supply circuit or various types of information,
the power supply control circuit having the register store the output set voltage value of the power supply circuit or information on a state of the power supply circuit based on a result of sensing by the sensing circuit, and
the control unit performing a prescribed operation based on the output set voltage value of the power supply circuit or the information on the state of the power supply circuit stored in the register.

7. The semiconductor device according to claim 6, wherein
the power supply control circuit outputs a notification signal to the control unit in response to the result of sensing by the sensing circuit, and
the control unit issues a request to the power supply control circuit for information on the state of the power supply circuit stored in the register based on the notification signal from the power supply control circuit.

8. The semiconductor device according to claim 6, wherein
the sensing circuit includes a temperature abnormal condition determination circuit which determines whether a temperature of the power supply circuit is normal, and
the power supply control circuit has the register store information indicating that the temperature of the power supply circuit is abnormal when the temperature of the power supply circuit is abnormal as a result of determination by the temperature abnormal condition determination circuit.

9. The semiconductor device according to claim 8, wherein
the power supply control circuit has the register store information indicating that the temperature of the power supply circuit is normal when the temperature of the power supply circuit is normal as a result of determination by the temperature abnormal condition determination circuit, and
the control unit performs a recovery operation based on information on a state of the temperature of the power supply circuit stored in the register.

10. The semiconductor device according to claim 6, wherein
the sensing circuit includes a voltage abnormal condition determination circuit which determines whether a voltage of the power supply circuit exceeds a reference value, and
the power supply control circuit has the register store information indicating that a voltage state of the power supply circuit is abnormal when a voltage of the power supply circuit is abnormal based on a result of determination by the voltage abnormal condition determination circuit.

11. The semiconductor device according to claim 10, wherein
the control unit instructs the power supply control circuit to perform a reset operation to initialize an operation of the power supply unit based on the information indicating that the voltage state of the power supply circuit is abnormal stored in the register.

12. The semiconductor device according to claim 11, wherein
the control unit counts the number of times of the reset operation performed, and
when the number of times of the reset operation performed is equal to or more than a prescribed number of times, the control unit stops an operation to reset the power supply unit.

13. A power feed system which feeds power to a USB device connected to a USB connector, the power feed system comprising:
a control unit which obtains information on an output voltage which can variably be set for driving the USB device by communicating with the USB device; and
a power supply unit which generates an output voltage to be supplied to the USB device based on the obtained information on the output voltage,
the power supply unit including
a power supply circuit,
a sensing circuit which senses an output voltage or an output state of the power supply circuit,
a power supply control circuit which controls the power supply circuit, and
a register which stores information on the power supply circuit,
the power supply control circuit outputting a notification signal based on a result of sensing by the sensing circuit to outside.

14. A semiconductor device comprising:
a register which sets a value of an output voltage to be supplied to a USB device connected to a USB connector;
a power supply circuit which regulates a generated voltage based on the value set in the register;
a voltage determination circuit which determines whether a value of the voltage regulated by the power supply circuit attains to the value of the voltage set in the register; and
a control circuit which outputs a notification signal based on a result of determination by the voltage determination circuit to outside.

15. The semiconductor device according to claim 14, wherein
the control circuit sets a value of the output voltage in the register based on an external setting command.

16. A semiconductor device comprising:
a power supply unit which generates an output voltage to be supplied to a USB device connected to a USB connector; and
a power supply control unit which controls the power supply unit,
the power supply unit including
a register which sets a value of the output voltage,
a power supply circuit which regulates a generated voltage based on a value set in the register,
a voltage determination circuit which determines whether a value of the voltage regulated by the power supply circuit attains to the value of the voltage set in the register, and
a communication circuit which outputs a notification signal based on a result of determination by the voltage determination circuit to the control unit,
the power supply control unit including
a timer which counts an elapsed time since issuance of an instruction to regulate the voltage generated in the power supply circuit of the power supply unit, and
a control device which determines whether the notification signal output from the power supply unit has been received within a prescribed period of time after lapse of the prescribed period of time and instructs the power supply unit to output the output voltage to the USB device connected to the USB connector when the control device determines that the control device has received the notification signal.

17. The semiconductor device according to claim 16, wherein
the control device does not instruct the power supply unit to output the output voltage to the USB device connected to the USB connector when the control device determines that the control device has not received the notification signal output from the power supply unit within the prescribed period of time after lapse of the prescribed period of time.

18. The semiconductor device according to claim 16, wherein
the control device outputs a timer reset instruction to the power supply unit every prescribed period after the control device gives an instruction to output the output voltage to the USB device, and
the power supply unit further includes a timer which initializes a timer value and starts time count upon receiving input of the timer reset instruction and a reset output circuit which obtains the timer value of the timer and outputs a reset signal to the power supply control unit to perform reset processing when the obtained timer value is equal to or greater than a prescribed value.

19. A power feed system which can feed power to first and second USB devices connected to first and second USB connectors, respectively, the power feed system comprising:
a first power supply unit provided in correspondence with the first USB connector;
a first control unit which is provided in correspondence with the first power supply unit, obtains information on a voltage necessary for driving the first USB device by communicating with the first USB device connected to the corresponding first USB connector, and controls the corresponding first power supply unit;
a second power supply unit provided in correspondence with the second USB connector; and
a second control unit which is provided in correspondence with the second power supply unit, obtains information on a voltage necessary for driving the second USB device by communicating with the second USB device connected to the corresponding second USB connector, and controls the corresponding second power supply unit,
the second control unit
obtaining from the first control unit, a first amount of electric power necessary for the first USB device connected to the first USB connector,
calculating an amount of suppliable electric power, the amount being calculated by subtracting the obtained first amount of electric power from a total amount of electric power, obtaining a second amount of electric power necessary for the second USB device connected to the second USB connector, comparing the second amount of electric power and the amount of suppliable electric power with each other and transmitting a request including information on an output voltage based on the amount of suppliable electric power to the second USB device when the second amount of electric power is greater than the amount of suppliable electric power, and instructing the second power supply unit to output an output voltage based on the amount of suppliable electric power to the second USB device when the second control unit receives a notification of acceptance of the request from the second USB device.

20. The power feed system according to claim 19, wherein the second control unit does not instruct the second power supply unit to output the output voltage based on the amount of suppliable electric power to the second USB device when the second control unit does not receive the notification of acceptance of the request from the second USB device.

21. The power feed system according to claim 19, wherein the first or second USB connector is connected to the first or second USB device through a USB cable.

22. A power feed system which can feed power to first and second USB devices connected to first and second USB connectors, respectively, the power feed system comprising:

a first power supply unit provided in correspondence with the first USB connector;

a first control unit which is provided in correspondence with the first power supply unit, obtains information on a voltage necessary for driving the first USB device by communicating with the first USB device connected to the corresponding first USB connector, and controls the corresponding first power supply unit;

a second power supply unit provided in correspondence with the second USB connector;

a second control unit which is provided in correspondence with the second power supply unit, obtains information on a voltage necessary for driving the second USB device by communicating with the second USB device connected to the corresponding second USB connector, and controls the corresponding second power supply unit; and a management unit connected to the first and second control units, the management unit obtaining from the first control unit, a first amount of electric power necessary for the first USB device connected to the first USB connector, calculating an amount of suppliable electric power, the amount being calculated by subtracting the obtained first amount of electric power from a total amount of electric power, obtaining a second amount of electric power necessary for the second USB device connected to the second USB connector, comparing the second amount of electric power and the amount of suppliable electric power with each other and transmitting a request including information on an output voltage based on the amount of suppliable electric power to the second USB device when the second amount of electric power is greater than the amount of suppliable electric power, and notifying the second control unit that the output voltage based on the amount of suppliable electric power can be output to the second USB device when the management unit receives a notification of acceptance of the request from the second USB device.

* * * * *